(12) United States Patent
Wang et al.

(10) Patent No.: US 10,339,634 B2
(45) Date of Patent: Jul. 2, 2019

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventors: Lu Wang, Shanghai (CN); Wenjing Cao, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 1 day.

(21) Appl. No.: 15/318,253

(22) PCT Filed: Dec. 11, 2015

(86) PCT No.: PCT/CN2015/097121
§ 371 (c)(1),
(2) Date: Dec. 12, 2016

(87) PCT Pub. No.: WO2017/096609
PCT Pub. Date: Jun. 15, 2017

(65) Prior Publication Data
US 2018/0204305 A1 Jul. 19, 2018

(51) Int. Cl.
*G06T 5/00* (2006.01)
*G06T 11/00* (2006.01)
*G06T 5/50* (2006.01)

(52) U.S. Cl.
CPC ............... *G06T 5/002* (2013.01); *G06T 5/50* (2013.01); *G06T 11/005* (2013.01);
(Continued)

(58) Field of Classification Search
CPC .... G06T 11/003; G06T 11/006; G06T 11/008; G06T 5/001; G06T 5/002; G06T 5/007;
(Continued)

(56) References Cited

U.S. PATENT DOCUMENTS 6,493,416 B1 * 12/2002 Hsieh ..................... A61B 6/032
378/4
6,542,573 B2   4/2003 Schomberg
(Continued)

FOREIGN PATENT DOCUMENTS

CN         103593289 A    2/2014
CN         103593829 A    2/2014
(Continued)

OTHER PUBLICATIONS

Malik, Showkat Hassan, Tariq Ahmad Lone, and S. M. K. Quadri. "Contrast enhancement and smoothing of CT images for diagnosis." Computing for Sustainable Global Development (INDIACom), 2015 2nd International Conference on. IEEE, 2015.*
(Continued)

*Primary Examiner* — Geoffrey E Summers
(74) *Attorney, Agent, or Firm* — Metis IP LLC

(57) ABSTRACT

The present disclosure relates to a system, method and storage medium for generating an image. At least one processor, when executing instructions, may perform one or more of the following operations. When raw data is received, a plurality of iterations may be implemented. During each iteration, a first voxel value relating to a first voxel in an image is calculated; at least a portion of a second voxel may be continuously changed with respect to at least a portion of the first voxel value; the image may be transformed to a projection domain to generate an estimated projection based on the first voxel value and the second voxel value; a projection error may be obtained based on the estimated projection and the raw data; and the image may be corrected or updated based on the projection error.

5 Claims, 21 Drawing Sheets

(52) U.S. Cl.
CPC .......... *G06T 11/006* (2013.01); *G06T 11/008* (2013.01); *G06T 2207/10081* (2013.01); *G06T 2207/10116* (2013.01); *G06T 2207/20224* (2013.01); *G06T 2211/416* (2013.01); *G06T 2211/424* (2013.01)

(58) Field of Classification Search
CPC .......... G06T 5/008; G06T 5/009; G06T 5/50; G06T 2207/10072; G06T 2207/10081; G06T 11/005; G06T 2207/20224; G06T 2207/10116; G06T 2211/424; G06T 2211/416
USPC ................................ 382/274, 275, 254, 131
See application file for complete search history.

(56) References Cited

U.S. PATENT DOCUMENTS

| | | | |
|---|---|---|---|
| 8,238,687 | B1* | 8/2012 | Lim ................ G06T 5/008 358/3.26 |
| 2007/0053483 | A1 | 3/2007 | Nagata |
| 2007/0242867 | A1 | 10/2007 | Jan et al. |
| 2008/0205729 | A1 | 8/2008 | Ziegler et al. |
| 2011/0105880 | A1 | 5/2011 | Yu et al. |
| 2012/0051626 | A1 | 3/2012 | Long et al. |
| 2012/0213327 | A1 | 8/2012 | Boas |
| 2012/0224760 | A1* | 9/2012 | Goshen .............. G06T 5/002 382/131 |
| 2013/0129172 | A1 | 5/2013 | Boese et al. |
| 2013/0251286 | A1 | 9/2013 | Brendel et al. |
| 2013/0315453 | A1 | 11/2013 | Cao et al. |
| 2014/0016849 | A1* | 1/2014 | Brown ................ G06T 5/50 382/131 |
| 2014/0314331 | A1* | 10/2014 | Zabic ................. G06T 5/002 382/254 |
| 2017/0039685 | A1* | 2/2017 | Goshen .............. G06T 5/002 |

FOREIGN PATENT DOCUMENTS

| | | |
|---|---|---|
| CN | 104207798 A | 12/2014 |
| CN | 103927768 B | 5/2015 |
| CN | 103186883 B | 9/2015 |
| CN | 103186890 B | 9/2015 |
| EP | 0519445 A1 | 12/1992 |
| EP | 1677256 A2 | 7/2006 |
| WO | 2004072904 A1 | 8/2004 |
| WO | 2008064367 A2 | 5/2008 |
| WO | 2011011684 A2 | 1/2011 |
| WO | 2011100723 A2 | 8/2011 |
| WO | 2012056361 A1 | 5/2012 |
| WO | 2015162519 A1 | 10/2015 |

OTHER PUBLICATIONS

Beister, Marcel, Daniel Kolditz, and Willi A. Kalender. "Iterative reconstruction methods in X-ray CT." Physica Medica 28.2 (2012): 94-108.*
International Search Report for PCT/CN2015/097121 dated Jul. 26, 2016, 6 pages.
Written Opinion of the International Searching Authority dated Jul. 26, 2016, 5 pages.
Yong Long et al. 3D Forward and Back-projection for X-ray CT Using Separable Footprints. IEEE Transactions on Medical Imaging, 2010, 29(11): 1839-1850.
Written Opinion for PCT/CN2015/097121 dated Jul. 26, 2016, 5 pages.
W Zbijewski et al., Comparison of methods for suppressing edge and aliasing artefacts in iterative x-ray CT reconstruction, Physics in Medicine and Biology, 51(7): 1877-1889 (2006).
S Matej et al., Practical considerations for 3-D image reconstruction using spherically symmetric volume elements, IEEE Transactions on Medical Imaging, 15(1): 68-78 (1996).
S P Muller et al., Maximum-Likelihood Estimation: A Mathematical Model for Quantitation in Nuclear Medicine, Journal of Nuclear Medicine Official Publication Society of Nuclear Medicine, 31(10): 1693-1701 (1990).
P-C Chiao et al., Model-Based Estimation for Dynamic Cardiac Studies Using ECT, IEEE Transactions on Medical Imaging, 13(2): 217-226 (1994).
G S Cunningham et al., Three-dimensional reconstructions from low-count SPECT data using deformable models with smooth interior intensity variations, Fully Three-Dimensional Image Reconstruction in Radiology and Nuclear Medicine, 21-24 (1999).
Z-P Liang et al., Constrained Reconstruction Methods in MR Imaging, Reviews of Magnetic Resonance in Medicine, 4: 67-185 (1992).
"Value." Merriam-Webster.com. Merriam-Webster, n.d. Web. Jul. 11, 2017.
S W Smith, The Scientist and Engineer's Guide to Digital signal Processing, California Technical Publishing, 442-450 (1997).
T-L Ji et al., Adaptive Image Contrast Enhancement Based on Human Visual Properties, IEEE Transactions on Medical Imaging, 13(4): 573-586 (1994).
Search Report in European Application No. 15896594.7 dated Jul. 4, 2018, 13 pages.
F Momey et al., Spline driven: high accuracy projectors for tomographic reconstruction from few projections, IEEE Transactions on Image Processing, 24(12): 4715-4725 (2015).
K Davood et al., On the computational implementation of forward and back-projection operations for cone-beam computed tomography, Medical & Biological Engineering & Computing, 54(8):1193-1204 (2015).
M Beister et al., Iterative reconstruction methods in X-ray CT, Physica Medica, 28: 94-108 (2012).

* cited by examiner

SYSTEM AND METHOD FOR IMAGE RECONSTRUCTION

CROSS-REFERENCE TO RELATED APPLICATIONS

This present application is a U.S. national stage under 35 U.S.C. § 371 of International Application PCT/CN2015/097121, filed on Dec. 11, 2015, designating the United States of America, the contents of which are hereby incorporated by reference.

TECHNICAL FIELD

The present disclosure relates to image processing and, more particularly, relates to a system and method for image construction and optimization based on raw data.

BACKGROUND

With the rapid evolution of radiation-based imaging technologies including, for example, CT technologies, and growth of their new clinical and industrial applications, fidelity of image especially under a low radiation dose attracts more attentions.

Image processing may include, for example, contrast enhancement, a denoising operation, or the like, or any combination thereof. The image quality may depend on, for example, the specific contrast enhancement mechanism or the noise model. The image quality may be sensitive to noise when low radiation dose is taken into account.

Image reconstruction may introduce artifacts to generated CT images. Generally, an object being exposed to X-ray during the forward projection may be divided into voxels, for example, cubic or cuboid voxels. The contribution of a certain voxel to detector cells may derive from, for example, the voxel value and a relevant contribution factor. Relevant contribution factor may be determined by the location of the voxel in a coordinate system of the detector cells. When the object is divided into voxels, the voxel values at the boundaries between the two voxels may be discontinuous, and the iteration process of forward and backward projection may bring about the boundary blurred effect.

SUMMARY OF THE INVENTION

Some embodiments of the present disclosure relates to an image processing system (for example, a system for processing computed tomography (CT) images) including a data acquisition unit, and an image reconstruction unit. The system may be configured to reconstruct an image of a subject. When the data acquisition unit receives raw data relating to the subject, the image reconstruction unit may perform one or more of the following operations. A plurality of iterations may be performed during the reconstruction. During each of the iterations, a first voxel value relating to a first voxel and a second voxel value relating to a second voxel at each successive iteration based on an image obtained from a prior iteration may be calculated. At least a portion of the second voxel value may be continuous with respect to at least a portion of the first voxel value. The reconstructed image may be transformed to a projection domain to generate an estimated projection based on the first voxel value and the second voxel value. The second voxel may be next to the first voxel. In some embodiments, the first voxel and the second voxel may be arranged along a direction that is the same as the direction of the subject being transported during an examination. In some embodiments, the first voxel and the second voxel may be arranged along a direction that is perpendicular to the direction of the subject being transported during an examination. The image reconstruction unit may further generate a projection error based on the estimated projection and the raw data. An image based on the projection error at each successive iteration may be generated to be used in next iteration. Different kinds of stopping conditions may be adopted to stop the iterations. In some embodiments, the stopping conditions may relate to some parameters set, for example, in the CT system. For example, the stopping condition may be that the difference between the reconstructed images from the current iteration and the last iteration is below a certain threshold. In other embodiments, the stopping conditions may be determined by a user. For example, the clinical images related to a certain tissue after several iterations may be accepted by the user (for example, a doctor). When the iteration is done, at least one reconstructed image may be obtained. For example, the reconstructed image may be the image generated in the last iteration. In some embodiments, the first voxel value relating to at least a portion of the first voxel may comprise a distribution according to a first function. The second voxel value relating to at least a portion of the second voxel may comprise a distribution according to a second function. In some embodiments, the first function and the second function may be the same. In some embodiments, the first function may be different from the second function. Exemplary functions may include a quadratic function, a cubic function, a 4th degree polynomial, an nth degree polynomial, an exponential function, a logarithmic function, a trigonometric function, an anti-trigonometric function, a hyperbolic function, or the like, or a combination thereof. Merely by way of example, the function may be a linear function. In some embodiments, a weighting factor may be generated, and the second voxel may be continuously changed with the first voxel value according to a correlation of more than one functions as described above based on the weighting factor. Additionally, the voxel value in a first portion of the first voxel may change differently with the voxel value in a second portion of the first voxel. The system may further include a noise reduction unit that may reduce the noise of an image, based on a noise model, to generate an updated image. In some embodiments, an updated image may be generated by reducing noise from the reconstructed image based on the noise model. Moreover, the system may include a contrast enhancement unit that may enhance the contrast of the updated image.

Some embodiments of the present disclosure relates to a storage medium including a machine readable computer program code and several instructions. The code and instructions may be used to reconstruct an image of a subject. The machine readable computer program code may be processed to implement an iterative reconstruction of a computed tomography image, and the instructions may be executed to cause a computer to implement the following operations. During each of the iterations, a first voxel value relating to a first voxel and a second voxel relating to a second voxel at each successive iteration based on an image obtained from a prior iteration may be calculated. At least a portion of the second voxel value may be continuous with respect to at least a portion of the first voxel value. The image may be transformed to a projection domain to generate an estimated projection based on the first voxel value and the second voxel value. The second voxel may be next to the first voxel along a direction that is the same as the direction when a subject is transported during an examination. The instructions may be executed to further generate a projection error based on the estimated projection and the raw data. An image based on the projection error may be generated at each successive iteration to be used in next iteration. The instructions may further include certain stopping conditions to stop the iteration. When the iteration is done, at least one reconstructed image may be obtained. In some embodiments, the first voxel value relating to at least a portion of the first may comprise a distribution according to a first function. The second voxel value relating to at least a portion of the second voxel may comprise a distribution according to a second function. In some embodiments, the first function and the second function may be the same. In some embodiments, the first function may be different from the second function. Merely by way of example, the first function and/or the second function may be a linear function. In some embodiments, a weighting factor may be generated, and at least a portion of the second voxel may be continuously changed with at least a portion of the first voxel value according to a correlation of more than one functions based on the weighting factor. Additionally, the voxel value in a first portion of the first voxel may change differently with the voxel value in a second portion of the first voxel. The instructions may be executed to further select a noise model, and an updated image may be generated by reducing noise from the reconstructed image based on the noise model.

Some embodiments of the present disclosure relates to a method for generating an image, for example, a computed tomography (CT) image. The method may include one or more of the following operations. Raw data relating to a subject may be received. A plurality of iterations may be performed during the reconstruction. During each of the iterations, an image may be generated. A first voxel value relating to a first voxel and a second voxel value relating to a second voxel in the image may be calculated, and at least a portion of the second voxel value is continuous with respect to at least a portion of the first voxel value. Alternatively, a contribution factor relating to the first voxel may be determined. The image may be transformed to a projection domain to generate an estimated projection based on the first voxel value, the second voxel value, and/or the contribution factor. The second voxel may be next to the first voxel. In some embodiments, the first voxel and the second voxel may be arranged along a direction that is the same as the direction of the subject being transmitted during an examination. In some embodiments, the first voxel and the second voxel may be arranged along a direction that is perpendicular to the direction of the subject being transported during an examination. A projection error based on the estimated projection and the raw data may be generated during the reconstruction. The methods may further including stopping the iteration under certain stopping conditions. When the iteration is done, at least one reconstructed image may be obtained. In some embodiments, the first voxel value relating to at least a portion of the first voxel may comprise a distribution according to a first function. The second voxel value relating to at least a portion of the second voxel may comprise a distribution according to a second function. In some embodiments, the first function and the second function may be the same. In some embodiments, the first function may be different from the second function. Merely by way of example, the first function and/or the second function may be a linear function. A weighting factor may be generated. In some embodiments, at least a portion of the second voxel may be continuously changed with at least a portion of the first voxel value according to a correlation of more than one functions based on the weighting factor. Additionally, the voxel value in a first portion of the first voxel may change differently with the voxel value in a second portion of the first voxel. The method may further include retrieve a noise model, and generating an updated image by reducing noise from the reconstructed image based on the noise model. Moreover, the method may include a process to enhance the contrast of the updated image.

Some embodiments of the present disclosure relates to a method for image construction, for example, an image reconstruction in computer tomography. The method may include one or more of the following operations. After raw data relating to a subject is received, a first image may be generated. A noise model relating to the distribution or amplitude of the first image may be retrieved or constructed. Then, a second image formed by reducing the noise from the first image based on the noise model. A third image relating to the noise may be generated. In some embodiments, the third image may be generated by subtracting the second image from the first image. In some image, the third image may be generated based on the noise model. Furthermore, a fourth image may be generated by enhancing the contrast of the second image. Moreover, the fourth image and the third image may be combined to form a fifth image. In some embodiments, the first image may be generated by a plurality of iterations. During each of the iterations, a first voxel value relating to a first voxel and a second voxel value relating to a second voxel at each successive iteration based on an image obtained from a prior iteration may be calculated. At least a portion of the second voxel value may be continuous with respect to at least a portion of the first voxel value. The image may be transformed to a projection domain to generate an estimated projection based on the first voxel value and the second voxel value. The second voxel may be next to the first voxel along a direction that is the same as the direction when a subject is transported during an examination. The method may further include generating a projection error based on the estimated projection and the raw data. Ann image may be further generated based on the projection error to be used in a next iteration. The methods may further include certain stopping conditions to stop the iteration. When the iteration is done, at least one reconstructed image may be obtained. In some embodiments, the first voxel value relating to at least a portion of the first voxel may comprise a distribution according to a first function. The second voxel value relating to at least a portion of the second voxel may comprise a distribution according to a second function. In some embodiments, the first function and the second function may be the same. In some embodiments, the first function may be different from the second function. Merely by way of example, the first function and/or the second function may be a linear function. A weighting factor may be generated. In some embodiments, at least a portion of the second voxel may be continuously changed with at least a portion of the first voxel value according to a correlation of more than one functions based on the weighting factor. Additionally, the voxel value in a first portion of the first voxel may change differently with the voxel value in a second portion of the first voxel.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
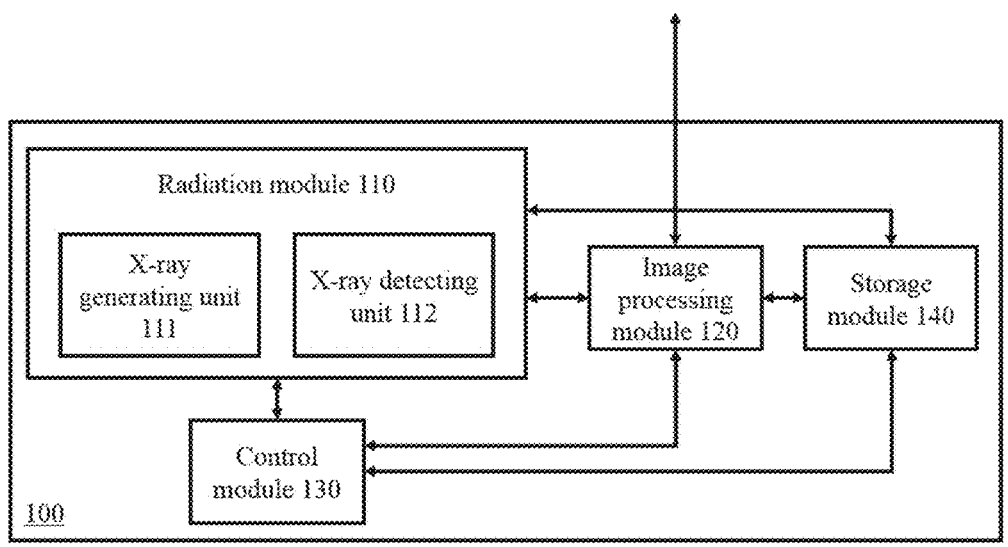
FIG. 1 is a block diagram of an X-ray imaging system according to some embodiments of the present disclosure.

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an,' and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "construction" and "reconstruction," when used in this disclosure, may represent a similar process in which an image may be transformed from data. Moreover, the phrase "image processing" and the phrase "image generation" may be used interchangeably. In some embodiments, image processing may include image generation.

The present disclosure provided herein relates to image processing. Specifically, the present disclosure relates to a system and method for image construction and optimization to obtain improved images, for example, CT images. Noise and/or the contrast of an image may have an impact on image quality. The object parameterization selected for image construction may influence the constructed image as well. The present disclosure provides a de-discretization object parametrization, a noise model selection for noise reduction, and a contrast enhancement. Some description of the present disclosure are provided in connection with computed tomography (CT) images. It is understood that it is for illustration purposes, and not intended to limit the scope of the present disclosure. The system and method disclosed herein may be used for processing images or image data from other imaging modalities including, for example, a digital radiography (DR) system, a multi-modality system, or the like, or any combination thereof. Exemplary multi-modality system may include a computed tomography-positron emission tomography (CT-PET) system, a computed tomography-magnetic resonance imaging (CT-MRI) system, etc.

FIG. 1 is a block diagram of an X-ray imaging system 100 according to some embodiments of the present disclosure. It should be noted that the X-ray imaging system described below is merely provided for illustrating an example of a radiation imaging system, and not intended to limit the scope of the present disclosure. The radiation used herein may include a particle ray, a photon ray, or the like, or any combination thereof. The particle ray may include neutron, proton, electron, μ-meson, heavy ion, or the like, or any combination thereof. The photon beam may include X-ray, γ-ray, α-ray, β-ray, ultraviolet, laser, or the like, or any combination thereof. For better understanding the present disclosure, an X-ray imaging system is described as an example of a radiation imaging system. The X-ray imaging system may find its applications in different fields such as, for example, medicine or industry. Merely by way of example, the X-ray imaging system may be a computed tomography (CT) system, a digital radiography (DR) system, a multi-modality system, or the like, or any combination thereof. Exemplary multi-modality system may include a computed tomography-positron emission tomography (CT-PET) system, a computed tomography-magnetic resonance imaging (CT-MRI) system, etc. As another example, the system may be used in internal inspection of components including e.g., flaw detection, security scanning, failure analysis, metrology, assembly analysis, void analysis, wall thickness analysis, or the like, or any combination thereof.

As illustrated in FIG. 1, the X-ray imaging system 100 may include, a radiation module 110, an image processing module 120, a control module 130, and a storage module 140. The radiation module 110 may include an X-ray generating unit 111 and an X-ray detecting unit 112. In some embodiments, the control module 130 may control the X-ray generating unit 111 and/or the X-ray detecting unit 112 of the radiation module 110, the image processing module 120, and/or the storage module 140. The image processing module 120 may process information received from the radiation module 110, the control module 130, and/or the storage module 140. The image processing module 120 may generate one or more CT images based on the information and deliver the images for display. The storage unit 140 may be configured or used to store information received from the image processing module 120, the control module 130, and/or the radiation module 110. The radiation module 110, the control module 130, the image processing module 120, and the storage module 140 may be connected with each other directly, or with an intermediate unit (not shown in FIG. 1). The intermediate unit may be a visible component or an invisible field (radio, optical, sonic, electromagnetic induction, etc.). The connection between different units may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof.

It should be noted that the above description about the radiation system is merely an example, should not be understood as the only embodiment. Obviously, to those skilled in the art, after understanding the basic principles of the connection between different units, the units and connection between the units may be modified or varied without departing from the principles. The modifications and variations are still within the scope of the current disclosure described above. In some embodiments, these units may be independent, and in some embodiments, part of the units may be integrated into one unit to work together.

The radiation module 110 may be configured or used to scan an object (not shown in FIG. 1) under examination and generate the raw data of an X-ray image. The object may include a substance, a tissue, an organ, a specimen, a body, or the like, or any combination thereof. In some embodiments, the object may include a patient or a part thereof. The objet may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. The X-ray generating unit 111 may be configured or used to generate X-rays to traverse the object under examination. The X-ray generating unit 111 may include an X-ray generator, a high-voltage generator, and/or other accessories. The X-ray generator may include one or more X-ray tubes. An X-ray tube may emit X-rays (or referred to as X-ray beams) by an X-ray tube. The X-ray generating unit 111 may be a cold cathode ion tube, a high vacuum hot cathode tube, a rotating anode tube, etc. The shape of the emitted X-ray beams may be a line, a narrow pencil, a narrow fan, a fan, a cone, a wedge, or the like, or an irregular shape, or any combination thereof. An X-ray tube in the X-ray generating unit 111 may be fixed at a location. An X-ray tube may be translated or rotated in some scenarios.

The X-ray detecting unit 112 may be configured to receive the X-rays emitted from the X-ray generating unit 111 or other radiation source. The X-rays from the X-ray generating unit 111 may traverse the object under examination, and then reach the X-ray detecting unit 112. After receiving the X-rays, the X-ray detecting unit 112 may generate the raw data of an X-ray image of the object under examination. The term "raw data" may refer to the data that may be detected by the X-ray detecting unit 112, and the data may be utilized to construct an X-ray image. The X-ray detecting unit 112 may be configured to receive X-rays and generate the raw data of an X-ray image of the object under examination. The X-ray detecting unit 112 may include an X-ray detector or other components. The shape of the X-ray detector may be flat, arc-shaped, circular, or the like, or any combination thereof. The fan angle of the arc-shaped detector may be an angle from 0° to 360°. The fan angle may be fixed or adjustable according to different conditions including, for example, the desired resolution of an image, the size of an image, the sensitivity of a detector, the stability of a detector, or the like, or any combination thereof. In some embodiments, the pixels of the detector may be the number of the smallest detecting units, e.g., the number of detector cells (e.g., scintillator or photosensor, etc.). The pixels of the detector may be arranged in a single row, two rows, or another number of rows. The X-ray detector may be one-dimensional, two-dimensional, or three-dimensional.

The control module 130 may be configured to control the radiation module 110, the image processing module 120, the storage module 140, or other units or devices in the system according to some embodiments of the present disclosure. The control module 130 may receive information from or send information to the radiation module 110, the image processing module 120, and/or the storage module 140. In some embodiments, the control module 130 may control the radiation module 110 to generate a certain voltage, and/or a certain current for a scanning of an object. Merely by way of example, the voltage and/or current may be different for examining people of different age, weight, height, or so forth. In some embodiments, the control module 130 may receive a command provided by a user including, for example, an imaging technician, or a doctor. Exemplary commands may include a scanning time, a location of the object, or a rotating speed of the gantry, or the like, or any combination thereof. The control module 130 may control the image processing module 120 to select different algorithms to process the raw data of an X-ray image. The control module 130 may be configured to select a protocol among multiple protocols that are designed for various scan scenarios. The control module 130 may transmit some commands to the storage module 140 to retrieve images for display. Exemplary commands may include the size of an image, the portion of an object to be displayed, the duration of an X-ray image to be displayed on a display screen, etc. In some embodiments of the present disclosure, an X-ray image may be divided into several sub-portions for display. The control module 130 may control the division of the X-ray image. For example, the control module 130 may determine the number of sub-portions to be generated, the size of a sub-portion, the region to be covered in a sub-portion, or the like, or any combination thereof. It should be noted that the above description about the control module is merely an example according to the present disclosure.

The image processing module 120 may be configured to process different kinds of information received from different modules or units including the radiation module 110, the control module 130, the storage module 140, or other modules or units that may generate information. The image processing module 120 may process the data from the radiation module 110 to generate an X-ray image of an object under examination. Image processing may be based on an algorithm including, for example, Fourier slice theorem, filtered back projection algorithm, fan-beam reconstruction, iterative reconstruction, or the like, or any combination thereof. The image processing module 120 may transfer the information from the storage module 140 to a particular form that may be identified, understood, or executed by the control module 130, and it may process the information from the control module 130 to retrieve data from the storage module 140. The information from the control module 130 to the radiation module 110 may be processed by the image processing module 120 firstly so that it may be identified, understood, or executed by the radiation module 110. The above description of the image processing module 120 is merely for exemplary purposes, should not be understood as the only embodiments, and these examples do not limit the scope of the present disclosure.

The storage module 140 may be configured or used to store information. The information may include programs, software, algorithms, data, text, number, images, voice, or the like, or any combination thereof. For example, a user or an operator may input some initial parameters or conditions to initiate a scan that may be stored in the storage module 140. Exemplary parameters or conditions may include the scanning time, the location of the object for scanning, the rotating speed of the gantry, or the like, or any combination thereof. As another example, some information may be imported from external resource, such as a floppy disk, a hard disk, a wireless terminal, or the like, or any combination thereof. The storage module 140 may receive information from the control module 130 to adjust some parameters relating to display. Said parameters may include, but are not limited to the size of an image, the portion of an object whose image is to be displayed, the duration that an image remains on a display screen, the order that images or portions of an image are to be displayed, or the like, or a combination thereof. In respect to the display of the X-ray images, the whole or part of an X-ray image may be displayed. In some embodiments, an X-ray image may be divided into several sub-portions, which may be displayed on a screen at the same time or in a certain order. According to some embodiments of the present disclosure, the user or the operator may select one or more sub-portions to display according to some conditions. Merely by way of example, the user may specify that an enlarged view of a sub-portion is to be displayed. Such information relating to display or other information may be provided by, for example, a user, real time when the information is to be used, or before the information is to be used and stored in, for example, in the storage module 140. It should be noted that the above description about the storage module 140 is merely an example according to some embodiments of the present disclosure.

It should be noted that the above description of the X-ray imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the X-ray imaging system 100 may be varied or changed according to specific implementation scenarios. Merely by way of example, some other components may be added into the X-ray imaging system 100, such as a patient positioning unit, a high-voltage tank, an amplifier unit, a storage unit, an analog-to-digital converter, a digital-to-analog converter, an interface circuit, or the like, or any combination thereof. The amplifier unit may be configured to amplify signals received by the X-ray detecting unit 112. Note that the X-ray imaging system may be a single-modality imaging system, or a multi-modality imaging system including, e.g., a positron emission tomography-computed tomography (PET-CT) system, a computed tomography-magnetic resonance imaging (CT-MRI) system, a remote medical X-ray imaging system, etc. However, those variations and modifications do not depart from the scope of the present disclosure.

Figure 2:
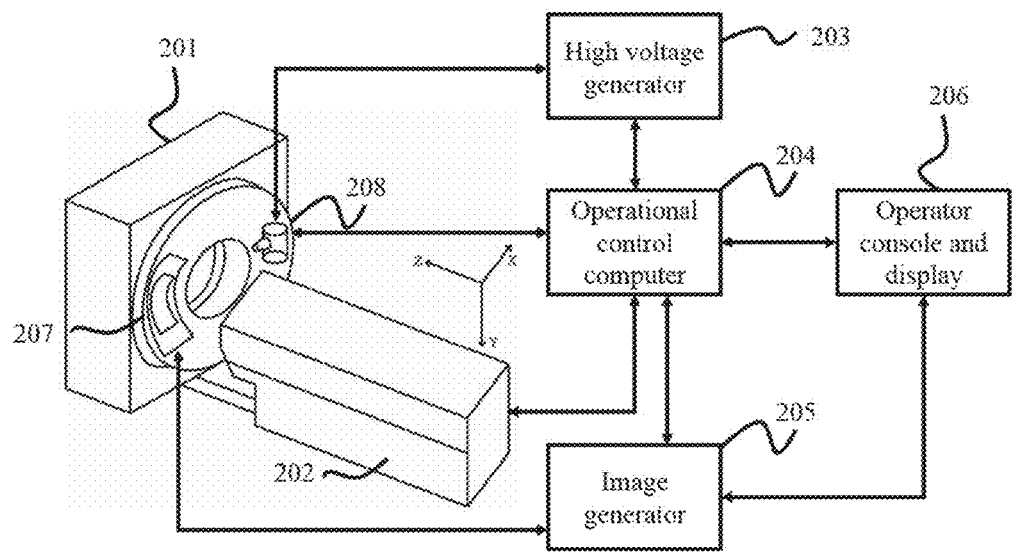
FIG. 2 is a block diagram of an X-ray imaging system according to some embodiments of the present disclosure.

FIG. 2 illustrates a block diagram of the X-ray imaging system 100 according to some embodiments of the present disclosure. As shown in the figure, the X-ray imaging system 100 may include a gantry 201, an object table 202, a high voltage generator 203, an operational control computer 204, an image generator 205, and an operator console and display 206.

The gantry 201 may be configured to house the components needed or used to produce and detect X-rays to generate a CT image. The gantry 201 may include an X-ray tube 208 and a detector 207. It should be noted that in alternative embodiments of the present disclosure, the high voltage generator 203 may be located in the gantry 201. The X-ray tube 208 may be configured to emit radiation that may be received by the detector 207 after it passes through an object exposed in the aperture of the gantry 201. Merely by way of example, the radiation may include a particle ray, a photon ray, or the like, or any combination thereof. The particle ray may include a stream of neutrons, protons, electrons, n-mesons, heavy ions, or the like, or any combination thereof. The photon beam may include an X-ray beam, a γ-ray beam, an α-ray beam, a β-ray beam, an ultraviolet beam, a laser beam, or the like, or any combination thereof. The object may include a substance, a tissue, an organ, an object, a specimen, a body, or the like, or any combination thereof. In some embodiments, the X-ray tube 208 may be a cold cathode ion tube, a high vacuum hot cathode tube, a rotating anode tube, etc. The shape of the X-ray beam emitted by the X-ray tube 208 may be a line, a narrow pencil, a narrow fan, a fan, a cone, a wedge, an irregular shape, or the like, or any combination thereof. The shape of the detector 207 may be flat, arc-shaped, circular, or the like, or any combination thereof. The fan angle of the arc-shaped detector may be an angle from 0° to 360°. The fan angle may be fixed or adjustable according to different conditions including, for example, the desired resolution of an image, the size of an image, the sensitivity of a detector, the stability of a detector, or the like, or any combination thereof. In some embodiments, the pixels of the detector 207 may be the number of the smallest detecting units, e.g., the number of detector cells (e.g., scintillator or photosensor, etc.). The pixels of the detector may be arranged in a single row, two rows, or another number of rows. The X-ray detector may be one-dimensional, two-dimensional, or three-dimensional.

The high voltage generator 203 may be configured to produce high voltage, and apply it to the X-ray tube 208. The voltage generated by the high voltage generator 203 may range from 80 kV to 140 kV, or from 120 kV to 140 kV. The current generated by the high voltage generator may range from 20 mA to 500 mA. In alternative embodiments of the present disclosure, the voltage generated by the high voltage generator 203 may range from 0 to 75 kV, or from 75 to 150 kV.

The operational control computer 204 may be configured to communicate bidirectionally with the gantry 201, the tube 208, the high voltage generator 203, the object table 202, the image generator 205, and/or the operator console display 204. Merely by way of example, the gantry 201 may be controlled by the operational control computer 204 to rotate to a desired position that may be prescribed by a user via the operator console and display 206. The operational control computer 204 may be configured to control the generation of the high voltage generator 203, for example, the magnitude of the voltage and/or the current generated by the high voltage generator 203. As another example, the operational control computer 204 may be configured to control the display of images on the operator console and display 206. For instance, the whole or part of an image may be displayed. In some embodiments, an image may be divided into several sub-portions, which may be displayed on a screen at the same time or in a certain order. According to some embodiments of the present disclosure, the user or the operator may select one or more sub-portions to display according to some conditions. Merely by way of example, the user may specify that an enlarged view of a sub-portion is to be displayed.

The operator console and display 206 may be coupled with the operational control computer 204 and the image generator 205. In some embodiments, the operator console and display 206 may be configured to display images generated by the image generator 205. In alternative embodiments, the operator console and display 206 may be configured to send a command to the image generator 205, and/or the operational control computer 204. Still in alternative embodiments of the present disclosure, the operator console and display 206 may be configured to set parameters for a scan. The parameters may include acquisition parameters and/or reconstruction parameters. Merely by way of example, the acquisition parameters may include tube potential, tube current, recon parameters (e.g., slice thickness), scan time, collimation/slice width, beam filtration, helical pitch, or the like, or any combination thereof. The reconstruction parameters may include reconstruction field of view, reconstruction matrix, convolution kernel/reconstruction filter, or the like, or any combination thereof.

The object table 202 may be configured to support a patient and move though the aperture of the gantry 201 during an examination. As shown in FIG. 2, the direction of a patient being transmitted during an examination is along the z direction. Depending on the ROI selected of the patient or the protocols selected, the patient may be positioned supine or prone, and either feet or head first. In some embodiments of the present disclosure, the object table 202 may be indexed between multiple scans. In alternative embodiments of the present disclosure, the object table 202 may be translated through the gantry 201 at a constant speed. The speed may relate to the length of the area to be scanned, the total scan time, the selected pitch, or the like, or any combination thereof. In some embodiments, the object table 202 may be used to support an object including a patient. Such a structure may move the object for examination through the X-ray imaging system. For brevity, such a structure may also be referred to a patient.

It should be noted that the description of the X-ray imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, the gantry 201 may further include a microphone, sagittal laser alignment light, patient guide lights, X-ray exposure indicator light, energy stop buttons, gantry control panels, external laser alignment lights, etc.

Figure 3:
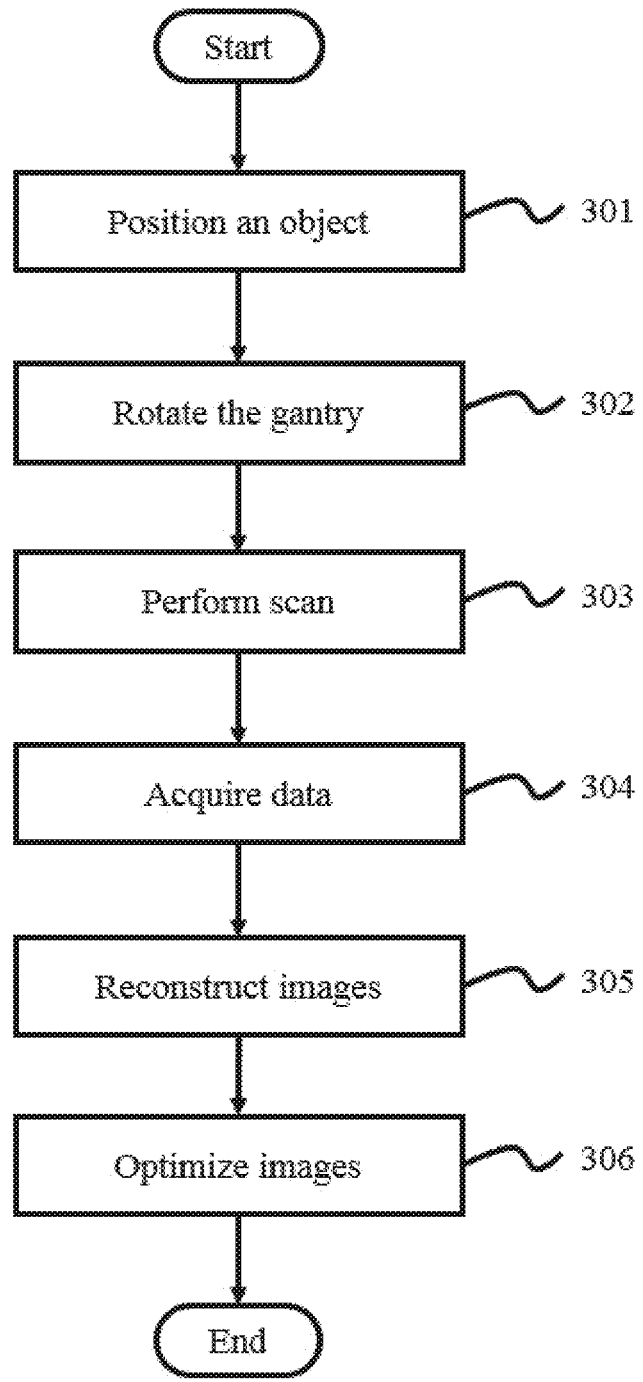
FIG. 3 is a flowchart illustrating a process of a CT scan according to some embodiments of the present disclosure.

FIG. 3 is a flowchart illustrating an imaging according to some embodiments of the present disclosure. In step 301, an object may be positioned in the X-ray imaging system 100, specifically, on the object table 202 that is described elsewhere in the present disclosure. Merely by way of example, the object may include a substance, a tissue, an organ, a specimen, a body, or the like, or any combination thereof. In some embodiments, the object may include a patient or a part thereof. The objet may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

After the object is positioned, the gantry of the X-ray imaging system 100 may be rotated to a desired position.

In step 303, a scan may be performed on the object. In some embodiments of the present disclosure, a number of protocols may be created for scanning different objects. Multiple parameters may be determined by the protocols. Merely by way of example, the parameters may be with respect to a collimator aperture, a detector aperture, an X-ray tube voltage and/or current, a scan mode, a table index speed, a gantry speed, a reconstruction field of view (FOV), kernel, or the like, or any combination thereof.

By way of the scan, the raw data corresponding to the object may be acquired in step 304.

After the raw data is acquired, the images of the object may be reconstructed in step 305. Merely by way of example, the reconstruction of the images may be based on methods including Fourier slice theorem, filtered back projection algorithm, fan-beam reconstruction, iterative reconstruction, etc.

The image reconstructed in step 305 may be optimized in step 306. The optimization may include noise reduction, contrast enhancement, etc.

It should be noted that the flowchart described above is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure.

Figure 4:
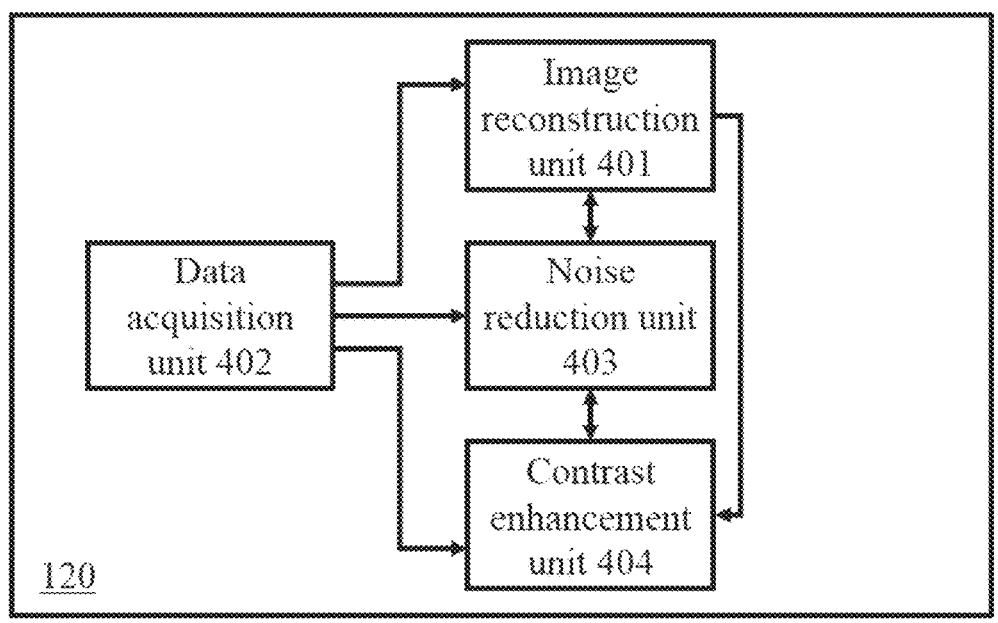
FIG. 4 is a block diagram of an image processing module according to some embodiments of the present disclosure.

FIG. 4 is a block diagram of the image processing module 120 according to some embodiments of the present disclosure. As shown in the figure, the image processing module 120 may include an image reconstruction unit 401, a data acquisition unit 402, a noise reduction unit 403, and a contrast enhancement unit 404. The data acquisition unit 402 may be configured to receive data from the X-ray detecting unit 112 that is described elsewhere in the present disclosure. The data received by the data acquisition unit 402 may be sent to the image reconstruction unit 401, the noise reduction unit 403, and/or the contrast enhancement unit 404. In some embodiments of the present disclosure, the data acquisition unit 402 may include an analog-to-digital converter (ADC). The ADC may be configured to convert the raw data detected by the detector into digital values.

The image reconstruction unit 401 may be configured to generate images of a scanned object. The generation may be based on methods including, for example, Fourier slice theorem, filtered back projection algorithm, fan-beam reconstruction, iterative reconstruction, etc. In some embodiments of the present disclosure, the image reconstruction unit 401 may be configured to perform forward projection and backward projection iteratively until a desired image is generated. In respect to the forward projection, a contribution factor and a voxel value may be calculated to determine the contribution of the voxels.

The noise reduction unit 403 may be configured to reduce the noise of images generated by the image reconstruction unit 401. Exemplary algorithms of noise reduction may include chroma and luminance noise separation, a linear smoothing filter, anisotropic diffusion, a non-local means, a nonlinear filter, wavelet transform, a statistical algorithm, or the like, or any combination thereof. In some embodiments of the present disclosure, a noise model may be selected or used to reduce the noise of the images generated by the image reconstruction unit 401.

The contrast enhancement unit 404 may be configured to enhance the contrast of images generated by the image reconstruction unit 401. Exemplary techniques utilized for contrast enhancement may include histogram equalization (HE), brightness bi-histogram equalization (BBHE), dualistic sub image histogram equalization (DSIHE), minimum mean brightness error bi-histogram equalization (MMBE-BHE), recursive mean separate histogram equalization (RM-SHE), multi histogram equalization (MHE), brightness preserving dynamic histogram equalization (BPDHE), recursive separated and weighted histogram equalization (RSWHE), global transformation histogram equalization (GHE), local transformation histogram equalization (LHE), local and global contrast stretching, or the like, or any combination thereof.

It should be noted that the above description of the image processing unit is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure. For example, the data acquired by the data acquisition unit may be sent to the image reconstruction unit 401, the noise reduction unit 403, and the contrast enhancement unit 404 either concurrently or sequentially.

Figure 5:
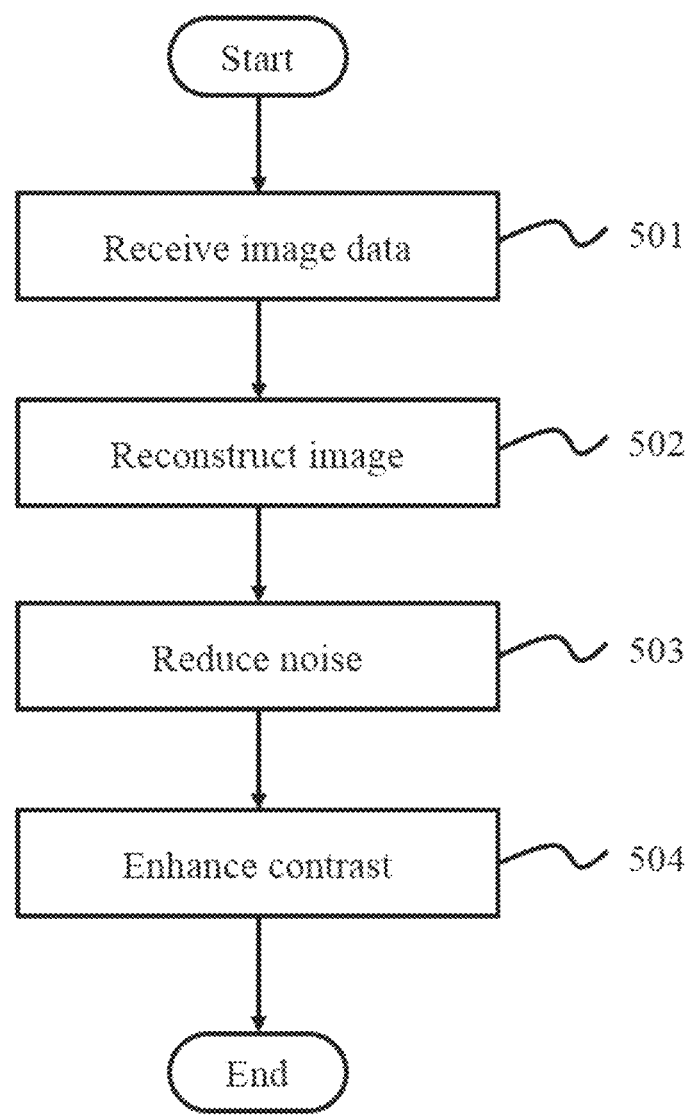
FIG. 5 is a flowchart illustrating a process of image processing according to some embodiments of the present disclosure.

FIG. 5 is a flowchart illustrating a process for image processing according to some embodiments of the present disclosure. In step 501, image data may be received.

In step 502, images of an object may be reconstructed based on part of the received image data. The object may include a substance, a tissue, an organ, a specimen, a body, or the like, or any combination thereof. In some embodiments, the object may include a patient or a part thereof. The objet may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

In some embodiments, the construction of the images may include approximating a voxel value of a voxel, calculating a contribution factor of the voxel, and calculating the forward projection of the voxel, etc. The voxel value may be approximated based on object parameterization. Merely by way of example, the object parameterization may include linear object parameterization, non-linear object parameterization, etc. Specifically, the linear object parameterization may be based on a Kaiser-Bessel window function, polar grids, logarithmic polar grids, overlapping circles or spheres, B-splines, wavelets, circular harmonics, Fourier series, or the like, or any combination thereof. The non-linear object parameterization may include disks, polygons, generalized series, bi-quadratic triangular Bezier patches, or the like, or any combination thereof. In some embodiments of the present disclosure, a de-discretization object parameterization may be utilized to construct images. The de-discretization object parameterization may take the gradual change of adjoining voxels into consideration.

The noise of an image reconstructed in step 502 may be reduced in step 503. Exemplary algorithms of noise reduction may include chroma and luminance noise separation, linear smoothing, anisotropic diffusion, a non-local means, nonlinear smoothing, wavelet transform, a statistical method algorithm, or the like, or any combination thereof. In an example, step 503 may include selecting at least a noise model and calculate the noise based on the selected noise model(s).

In step 504, the contrast of the images reconstructed in step 502 may be enhanced. The techniques utilized for contrast enhancement may include histogram equalization (HE), brightness bi-histogram equalization (BBHE), dualistic sub image histogram equalization (DSIHE), minimum mean brightness error bi-histogram equalization (MMBE-BHE), recursive mean separate histogram equalization (RM-SHE), multi histogram equalization (MHE), brightness preserving dynamic histogram equalization (BPDHE), recursive separated and weighted histogram equalization (RSWHE), global transformation histogram equalization (GHE), local transformation histogram equalization (LHE), local and global contrast stretching, etc.

It should be noted that the flowchart described above is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure. For example, step 502, step 503 and/or step 504 may be performed at any order. As one example, the reducing noise in step 503 may be performed preceding to the reconstructing image in step 502. The reconstructing image in step 502 may be based on the noise model that may be selected in step 503. As another example, step 503 and step 504 may be performed before step 502. Step 502 and step 503 may be merged as a single step that may include both image construction and noise reduction. Contrast enhancement may be performed on the noise model selected in step 503 as well.

Figure 6:
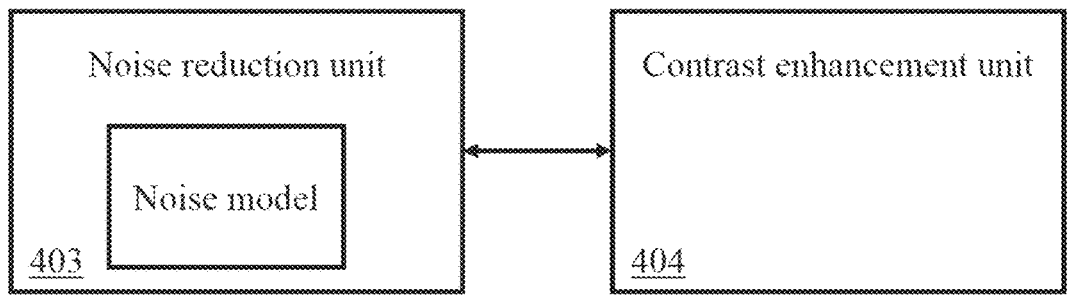
FIG. 6 is a block diagram of a noise reduction unit and a contrast enhancement unit according to some embodiments of the present disclosure.

FIG. 6 is a block diagram of the noise reduction unit 403 and the contrast enhancement unit 404 according to some embodiments of the present disclosure. As shown in the figure, the noise reduction unit 403 may communicate bidirectionally with the contrast enhancement unit 404. The noise reduction unit 403 may further include a noise model 601 or retrieve it from outside of the noise reduction unit 403. For instance, one or more noise models 601 may be stored in a storage including, for example, the storage module 140 or an external storage device or media.

The noise reduction unit 403 may be configured to reduce noise of the images, for example, images generated by the image construction unit 401 that is described elsewhere in the present disclosure. Exemplary algorithms of noise reduction may include chroma and luminance noise separation, a linear smoothing filter, anisotropic diffusion, a non-local means, a nonlinear filter, wavelet transform, a statistical algorithm, or the like, or any combination thereof.

The contrast enhancement unit 404 may be configured to enhance the contrast of the images, for example, images generated by the image reconstruction unit 401 that is described elsewhere in the present disclosure. The techniques utilized for contrast enhancement may include histogram equalization (HE), brightness bi-histogram equalization (BBHE), dualistic sub image histogram equalization (DSIHE), minimum mean brightness error bi-histogram equalization (MMBEBHE), recursive mean separate histogram equalization (RMSHE), multi histogram equalization (MHE), brightness preserving dynamic histogram equalization (BPDHE), recursive separated and weighted histogram equalization (RSWHE), global transformation histogram equalization (GHE), local transformation histogram equalization (LHE), local and global contrast stretching, etc.

The noise model 601 may be configured to represent the information relating to the noise of an image. Merely by way of example, the noise model 601 may indicate the noise distribution of an image, noise amplitude at respective point(s) of an image, or the like, or a combination thereof. The noise of an image may vary with respect to the directions. For instance, the noise along the z direction may be different from the noise on the x-y plane. The noise distribution may be in the form of uniform noise, Gaussian noise, salt & pepper noise, Gamma noise, Rayleigh distribution, Laplacian noise, or the like, or any combination thereof.

It should be noted that the above description of the noise reduction unit 403 and the contrast enhancement unit 404 is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

An image optimization may be performed on, for example, a reconstructed image. Exemplary optimization methods may include enhancing the contrast of the denoised image. In some embodiments, contrast may be defined as the difference in luminance or color that may make an object distinguishable in an image. In visual perception of the real world, contrast may be determined by the difference in the color and/or brightness between the object of interest and a neighboring or surrounding object within the field of view or region of interest. In an embodiment, contrast may be represented by $$\frac{|S_A - S_B|}{S_a},$$

where $|S_A-S_B|$ may denote luminance difference for signal producing structures A and B in the region of interest, and $S_a$ may denote the average luminance of that region.

Contrast-to-noise ratio (CNR) is a parameter used to determine image quality. In some embodiments, CNR may be defined as the ratio of the intensity of a signal and the background noise. For instance, CNR may be expressed by equation (1) below:

$$C = \frac{|S_A - S_B|}{\delta_0}, \quad (1)$$

where $\delta_0$ is the standard deviation of pure image noise. The equation (1) may be interpreted in another way in which $|S_A-S_B|$ may represent the contrast difference and $\delta_0$ may be relative to the noise variance for assessing noise.

In some embodiments, the image quality may deteriorate in the process of image reconstruction. For example, the deterioration may be due to at least partially to the inherent quantum noise of X-ray, the electronic noise generated by an electronic device, e.g., a sensor, the circuitry of the scanner, or the like, or any combination thereof. These noises may reduce the image quality. Under a low radiation dose, the reduction in image quality may be dramatic. In some embodiments, some noise models may be used to remove at least some of the noise from scanned data. Generally, estimated noise variance may be used to assess the characteristics of the noise. An exemplary process for obtaining the noise variance may include: reconstructing the raw data corresponding to the scan data to generate an initial image, calculating a weighted average of the values of pixels or voxels in a section of the initial image, subtracting the weighted average from that section of the initial image to generate a subtracted section, and obtaining the noise variance of the section of the initial image based on the subtracted section.

However, obtaining the noise variance described above may encounter drawbacks that the described subtraction may contain both noise and a high frequency component within the section, thereby resulting in inaccuracy in the obtained noise variance of the section of the initial image. Additionally, a low radiation dose may lead to a high noise in the initial image. For example, if the dose is reduced by 50%, noise variance may grow by $$\frac{1}{\sqrt{0.5}}$$

or 141.4%. The noise variance may be expressed as:

$$\delta_{p1}^2 = \frac{C_f}{R}, \quad (2)$$

where $C_f$ may be a constant, R may denote the dose reduction coefficient, and $\delta_{p1}$ may denote the noise increment coefficient. Table 1 below illustrates a relationship between a radiation dose and the noise. The dose reduction coefficient R may be expressed as a ratio of a radiation dose to a reference radiation dose, and the noise increment coefficient $\delta_{p1}$ may be expressed as a ratio of a noise level to a reference noise level. According to Table 1, the noise increment coefficient $\delta_{p1}$ may increase as the radiation dose decreases. It may be difficult to eliminate noises of an image of interest when the noise increment coefficient $\delta_{p1}$ is high.

TABLE 1

| | Dose reduction coefficient (%) | | | | | | | |
|---|---|---|---|---|---|---|---|---|
| | 90 | 80 | 70 | 60 | 50 | 40 | 30 | 20 |
| Noise increment coefficient (%) | 105.4 | 111.8 | 119.5 | 129.1 | 141.4 | 158.1 | 182.6 | 223.6 |

In some embodiments, the noise variance may be reduced. The method for reducing the noise variation may include obtaining raw data by scanning an object, calibrating the raw data by air calibration to obtain calibrated raw data, generating a calibrated noise variance based on the calibrated raw data, and reducing the calibrated noise variance to produce a reduced noise variance (or referred to as a final noise variance).

In some embodiments, the final noise variance may be the initial noise variance corresponding to the initially reconstructed image.

In some embodiments, the method for reducing the noise variation may also include the step of calibrating the initial noise variance.

Figure 9:
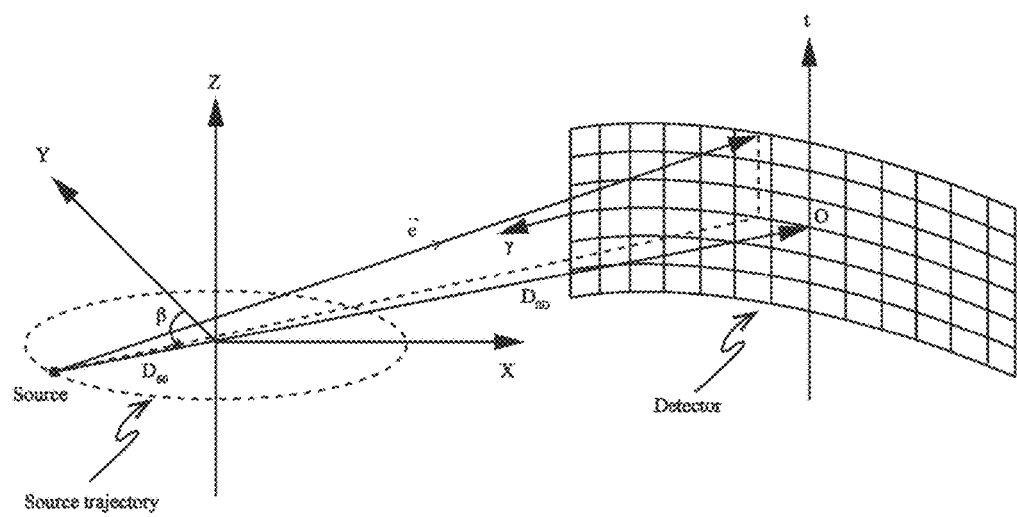
FIG. 9 is a diagram illustrating an exemplary axial cone-beam flat-detector geometry according to some embodiments of the present disclosure.

In some embodiments, the calibrated noise variance may be calculated from:

$$\delta_p^2 = \frac{1}{\delta_{photon}^2} + \frac{\delta_{elec}^2}{I^2}, \quad (3)$$

where $\delta_{photon}^2$ denote a quantum noise variance, $\delta_{elec}^2$ denote an electronic noise variance, and I may denote the intensity of the X-ray through the object collected by the detector cells illustrated in in connection with FIG. 9.

In alternative embodiments, the reduced noise variance may be calculated from $$\delta_{pnew}^2 = \frac{\delta_p^2}{s(p)}, \quad (4)$$

where s(p) may denote the reduction factor, and s(p)≥1.

Figure 7A:
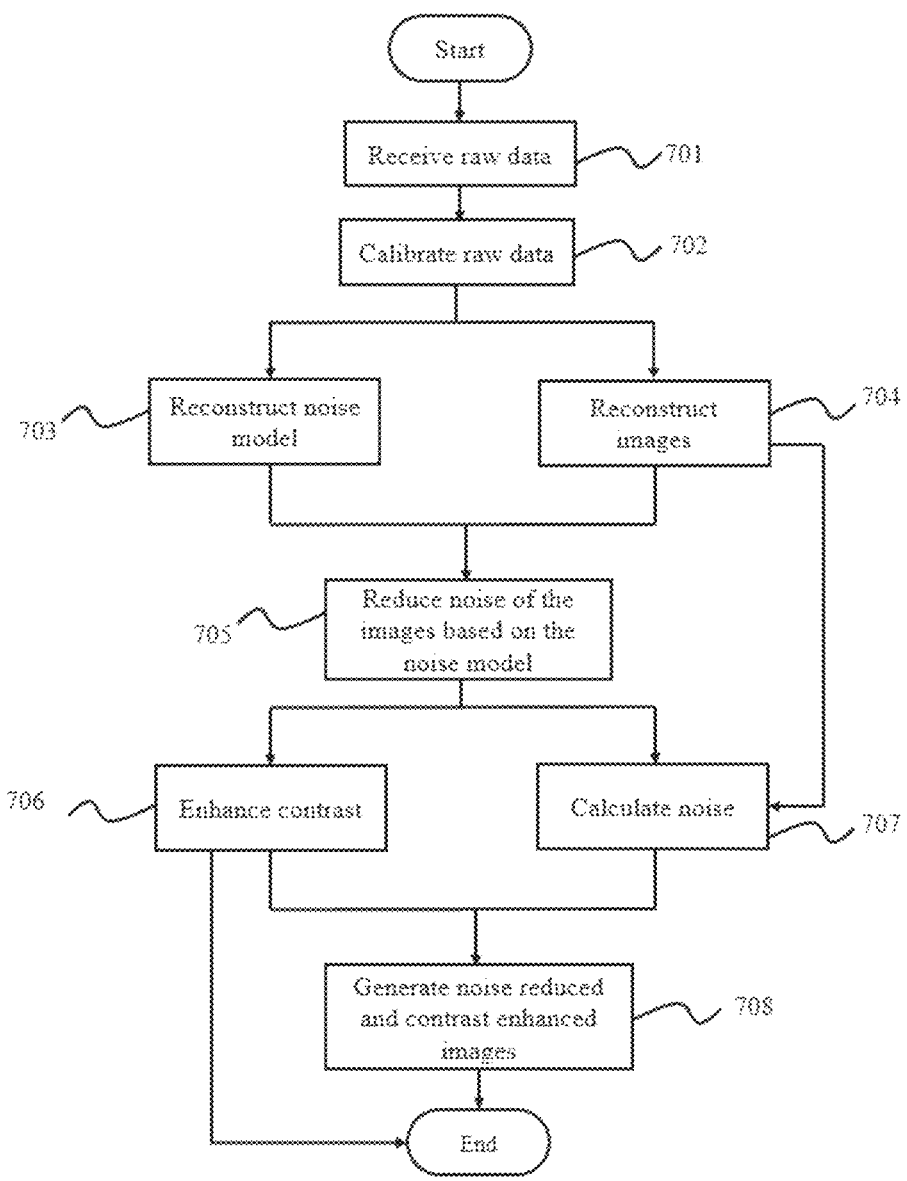
FIGS. 7A-7B are flowcharts illustrating exemplary processes of noise reduction and contrast enhancement according to some embodiments of the present disclosure.

FIG. 7A is an exemplary flowchart illustrating a process for noise reduction and contrast enhancement according to some embodiments of the present disclosure. Raw data may be calibrated in step 702 after the reception of the raw data in step 701. Noise model(s) may be selected in step 703. Reconstructed images may be obtained by way of image reconstruction in step 704. Merely by way of example, the reconstruction of images may include an iterative process of forward projection and backward projection. Exemplary iterative process of forward projection and backward projection will be described in details in connection with FIG. 10. In another example, the reconstruction in step 704 may be realized by a certain analytic reconstruction method, e.g., Fourier slice theorem, filtered back projection algorithm, fan-beam reconstruction, etc. In some embodiments, images reconstruction in step 704 may be based on the noise model selected in step 703. In some embodiments, a noise models selected in step 703 may be based on the reconstructed images obtained in step 704. A noise-reduced and contrast-enhanced image may then be generated in step 705 and step 706. Thereafter, the contrast-enhanced image may be further processed in step 708 by adding an amount of noise. The amount of noise added back to the contrast-enhanced image may be controlled and/or adjusted.

It should be noted that the noise reduction and contrast enhancement may be applied before, after or during the iteration of forward and backward projection. For instance, the raw data in step 701 may be obtained from the scanned data of the object in step 1001 or the output image after the iteration (as discussed in connection with FIG. 10).

The raw data received in step 701 may be the data generated by a scan process (for example, a scan process in which an object is scanned) or the initial data manually set by, for example, a user. Step 702 may include calibrating the raw data received in step 701. In some embodiments, for example, raw data calibration in step 702 may include gas calibration (air calibration), center calibration, water calibration, or the like, or any combination thereof. Air calibration and water calibration may be a scan (for example, a CT scan) of slices of air or water to produce a pre-scanned data of air or water. Thereafter, the pre-scanned data may be subtracted from the scanned data of the object in a subsequent scan to obtain calibrated scanned data of the object. Center calibration or other types of system calibration may also be used to monitor the locations or the Cartesian coordinate of the X-ray tube. Exemplary noise models utilized in step 703 include a Gaussian-type model, a Poisson-type model, etc., or the noise model described elsewhere in the present disclosure.

In Step 705, a denoised image may be formed by reducing the noise from the reconstructed image based on the noise model as mentioned above. An image relating to the noise in the reconstructed image may be generated in step 707 based on the denoised image generated in step 705. Merely by way of example, the image relating to the noise may be calculated by subtracting the denoised image from the reconstructed image. Contrast enhancement for the denoised image may be performed in step 706. In step 708, a corrected image may be formed based on the contrast enhanced image and the image relating to the noise. For example, the corrected image may be a combination of the contrast enhanced image and the image relating to the noise.

Figure 7B:
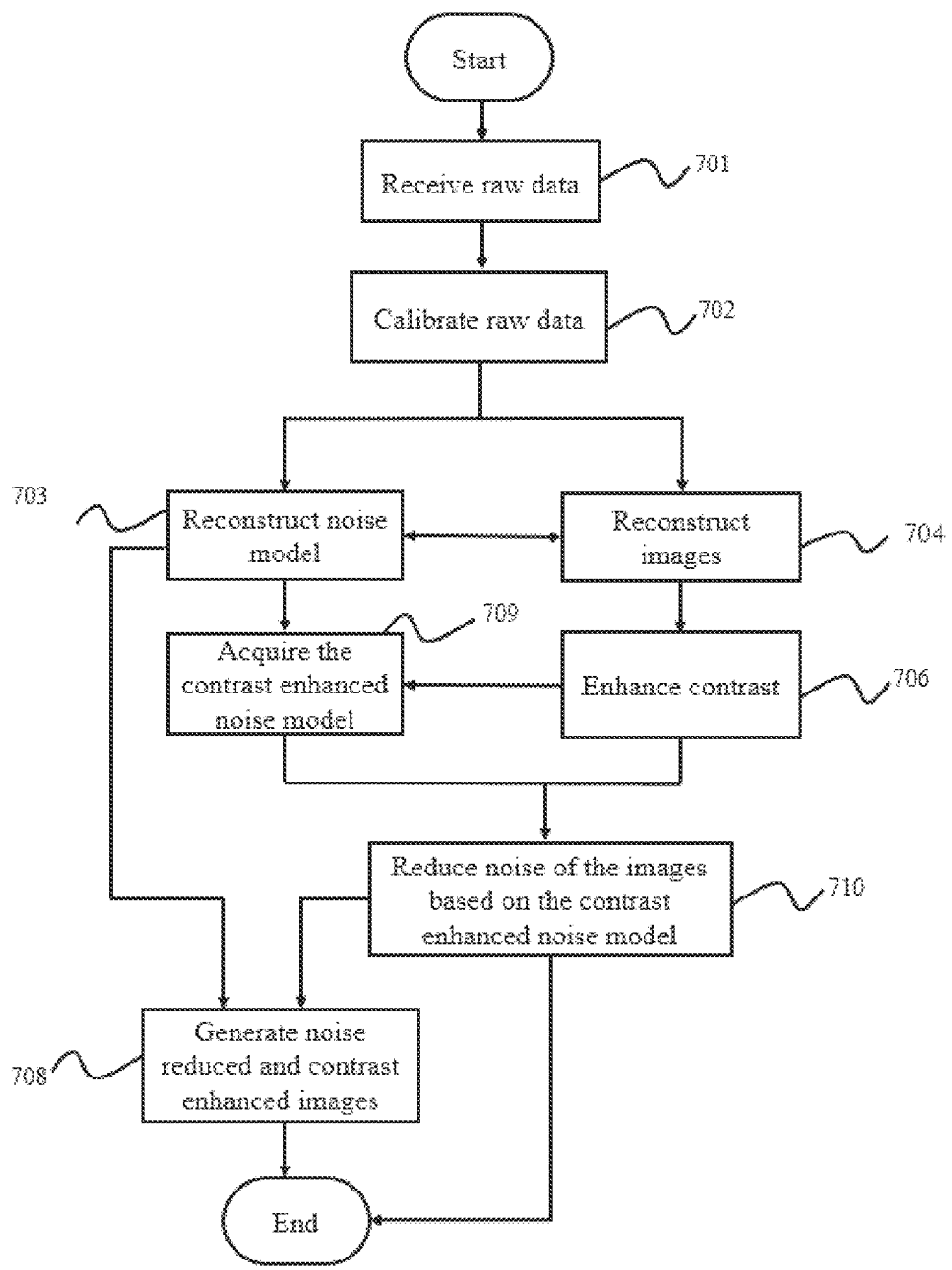

FIG. 7B is another flowchart illustrating a process for noise reduction and contrast enhancement according to some embodiments of the present disclosure. Step 701, step 702, step 703 and step 704 may be the same as those of FIG. 7A. Step 706 may be performed before step 710. A contrast enhanced noise model may be acquired in step 709. Then, step 710 may be performed to denoise (for example, reduce or remove noise from) the contrast enhanced image according to the contrast enhanced noise model in step 709. Optionally, at step 708, the noise model selected in step 703 may be applied to the denoised and contrast enhanced image to generate a corrected image. Merely by way of example, an image relating to noise may be generated based on the selected noise model and further added to the denoised and contrast enhanced image generated in step 710.

It should be noted that the noise added back to the denoised and contrast enhanced image may be produced from step 709 instead of step 703.

In the exemplary context of a CT system, operations including, for example, the denoising, contrast enhancement, etc., may be employed to improve image quality. Factors including, for example, the sequence of denoising and contrast enhancement steps, the precision of the noise model, etc. may need to be considered. Another factor relating to the optimization of a voxel value curve for neighboring voxels during the iteration of forward and backward projection is described in connection with FIG. 10.

It should be understood that the exemplary processes for flowcharts of noise reduction and contrast enhancement described above are provided for the purposes of illustration, and not intended to limit the scope of the present disclosure. For persons having ordinary skills in the art, various variations and modifications may be conducted under the teaching of the present disclosure. However, those variations and modifications may not depart from the scope of the present disclosure. For example, an imaging relating to the noise in the reconstructed image may be generated, based on the noise model, prior to the generation of the denoised image. Moreover, the denoised image may be generated based on the image relating to the noise, for example, by subtracting the image relating to the noise from the reconstructed image.

Figure 8:
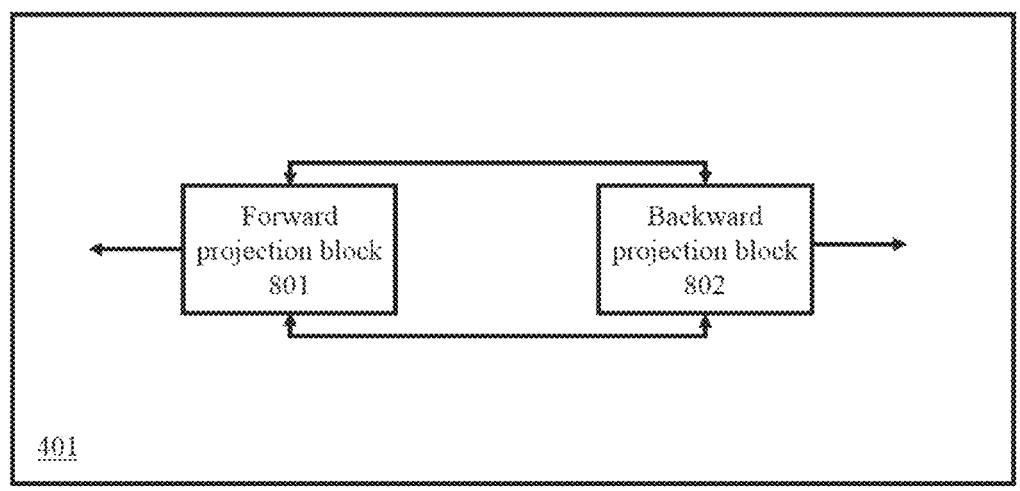
FIG. 8 is a block diagram of an image reconstruction unit according to some embodiments of the present disclosure.

FIG. 8 illustrates an exemplary image reconstruction unit according to some embodiments of the present disclosure. The image reconstruction unit 401 may include a forward projection block 801 and a backward projection block 802. During an image reconstruction, an operation by the forward projection block 801 and an operation by the backward projection block 802 may be performed sequentially and iteratively. For example, after an initial image is acquired, a forward projection may be performed by the forward projection block 801, where the image may be transformed to generate projected data. When projected data or data relating to the projected data is acquired by the backward projection block 802, a backward projection may be performed, where the data may be transformed to form an image. As used herein, the initial image may be generated from raw data, e.g., the raw data may be backward projected to form an initial image, or the data may be transformed to an initial image using other methods.

The forward/backward projections in statistical model based image reconstruction may be based on different kinds of beam geometries and aim at revealing geometric and physics reality of the imaging system. Exemplary beam geometries may include, but not limited to, cone beam, parallel beam, fan beam, or the like, or a combination thereof. The geometry used to perform the image reconstruction may be two-dimensional (2D) or three-dimensional (3D). For simplicity, an exemplary cone beam geometry is illustrated in FIG. 9 according to some embodiments of the present disclosures, where an image coordinate system of a reconstruction platform is also used. The X-ray source may be located on points on a circle of radius $D_{so}$ centered at $\vec{o}$ on the z=0 plane. $D_{so}$ may denote the distance between the source $\vec{p}_0$ and the rotation center $\vec{o} \| \vec{o} - \vec{p}_0 \|$. $D_{OD}$ may denote the distance between the rotation center and the origin of a local coordinate of the detector. The letter γ in FIG. 9 may denote a detector channel-direction local coordinate defined by an angle and whose coordinate axis is located in the γ-axis. The letter t in FIG. 9 may denote a detector slice-direction local coordinate defined by a length and whose coordinate axis is located in the t-axis. The vector $\vec{e}$ in FIG. 9 may denote a radiation ray from the source to the detector.

The forward projection may be defined as:

$$\text{Proj}(\gamma_k, t_l, \beta) = \Sigma_{(x,y,z)} a(\gamma_k, t_l, \beta, \vec{n}) f(\vec{n}) \quad (5)$$

where Proj(γ,t,β) may denote a line integral of the attenuation coefficients along the path connecting the source and the detector coordinate (γ,t), β may denote the angle of the source point counter-clockwise from the y axis (when the view is from the positive direction of the z-axis), $f(\vec{n})$ may denote a 2D or 3D image voxel value, and $\vec{n}$ may be located in the voxel center coordinate (x, y, z) whose coordinate (0,0,0) is located at $\vec{o}$, $a(\gamma_k, t_l, \beta, \vec{n})$ may denote the voxel contribution factor (e.g., a footprint function), and $(\gamma_k, t_l)$ may denote the center of a detector cell specified by indices (k,l). In some embodiments, $$\gamma_k = (k - w_\gamma)\Delta_\gamma, k = 0, \ldots, N_\gamma - 1 \quad (6)$$
$$t_l = (l - w_t)\Delta_t, l = 0, \ldots, N_t - 1$$
$$w_\gamma = \frac{N_\gamma - 1}{2} + c_\gamma$$
$$w_t = \frac{N_t - 1}{2} + c_t$$
$$c_\gamma = \frac{c_s}{D_{sd}},$$

where the parameters $c_s$ and $c_t$ may denote the offsets for the detector, $D_{sd}$ may denote the distance between the source $\vec{p}_0$ to detector center $\vec{O}_{detector} \| \vec{o}_{detector} - \vec{p}_0 \|$, and $\Delta_\gamma$ and $\Delta_t$ may denote the detector cell (e.g., a grid on the detector as shown in FIG. 9) spacing in γ and t.

The backward projection may be defined as:

$$f(\vec{n}) = \Sigma_{(\gamma_k, t_l, \beta)} a(\gamma_k, t_l, \beta, \vec{n}) \text{Proj}(\gamma_k, t_l, \beta). \quad (7)$$

The contribution factor $a(\gamma_k, t_l, \beta, \vec{n})$ (or the adjoint thereof) denoting a projection operator that may represent the contribution of $f(\vec{n})$ forward projected to Proj(γ,t,β) or the contribution of Proj(γ,t,β) backward projected to $f(\vec{n})$ at an angle β, may be defined as:

$$a(\gamma_k, t_l, \beta, \vec{n}) = l(\gamma_k, t_l, \beta; \vec{n}) F(\gamma_k, t_l, \beta, \vec{n}) \quad (8)$$

where $F(\gamma_k, t_l, \beta, \vec{n})$ may denote a 2D function with a unit amplitude and represent the voxel shadow casting on the detector $(\gamma_k, t_l)$, and $l(\gamma_k, t_l, \beta; \vec{n})$ may denote the amplitude of $F(\gamma_k, t_l, \beta, \vec{n})$ and represent the casting ray length through the voxel. The casting ray direction may be determined by the ray connecting the source $\vec{p}_0$ and $\vec{n}$.

As described elsewhere in the disclosure, an image may be transformed from an image domain into data in a projection domain by forward projection, and backward projection may transform the data from the projection domain back to the image domain. In a forward projection, as shown in equation (5), the projected data may be determined by both the contribution factor $a(\gamma_k, t_l, \beta, \vec{n})$ and the image voxel value $f(\vec{n})$. In a backward projection, as shown in equation (7), the image may be determined by both the contribution factor $a(\gamma_k, t_l, \beta, \vec{n})$ and a line integral Proj($\gamma_k, t_l, \beta$) of the attenuation coefficients.

It shall be appreciated by a person having ordinary skills in the art that the forward projection may be either a discretized or continuous evaluation of the transform. In some embodiments, the distribution of the voxel value may be configured as discretized, meaning that $f(\vec{n})$ of two neighboring voxels are not continuous. In some embodiments, the distribution of the voxel value may be configured as continuous, meaning that $f(\vec{n})$ of neighboring voxels are continuous. In some embodiments, the distribution of the voxel values may be configured as partially discretized and partially continuous, meaning that the $f(\vec{n})$ of at least some voxels in one condition are continuous and the f) of at least some voxels in another condition are discretized. Merely by way of example, the $f(\vec{n})$ of two neighboring voxels in the x-y plane may be discretized, and the $f(\vec{n})$ of two neighboring voxels along the z direction may be continuous. In another example, the $f(\vec{n})$ of two neighboring voxels in the x-y plane may be continuous, and the $f(\vec{n})$ of two neighboring voxels along the z direction may be discretized. In still another example, the $f(\vec{n})$ of two neighboring voxels along the z direction within a range of the z coordinate may be discretized, and the $f(\vec{n})$ of two neighboring voxels along the z direction within another range of the z coordinate may be continuous.

Approximately, the footprint shadow may be separated into two independent directions:

$$F(\gamma_k, t_l, \beta, \vec{n}) = F_1(\gamma_k, \beta, \vec{n}) F_2(t_l, \beta, \vec{n}) \quad (9)$$

where $F_1(\gamma_k, \beta, \vec{n})$ may denote the footprint shadow along the detector channel-direction, and $F_2(t_l, \beta, \vec{n})$ may denote the footprint shadow along the detector slice direction.

In some embodiments, the γ angle in arc detector channel direction may be large. The footprint shadow may be approximated by a trapezoid shape and defined by:

$$F_1(\gamma_k, \beta, \vec{n}) = \frac{1}{NF_1} \Psi\left(\gamma_k - \frac{\Delta_\gamma}{2}, \gamma_k + \frac{\Delta_\gamma}{2}\right), \quad (10)$$

$$\Psi(\gamma_1, \gamma_2) = \quad (11)$$

$$\int_{\gamma_1}^{\gamma_2} \text{trap}(\gamma; \tau_0, \tau_1, \tau_2, \tau_3) d\gamma = \Psi_1(\max(\gamma_1, \tau_0), \min(\gamma_2, \tau_1)) + \Psi_2(\max(\gamma_1, \tau_1), \min(\gamma_2, \tau_2)) + \Psi_3(\max(\gamma_1, \tau_2), \min(\gamma_2, \tau_3)),$$

$$\Psi_1(b_1, b_2) = \frac{1}{2(\tau_1 - \tau_0)}[(b_2 - \tau_0)^2 - (b_1 - \tau_0)^2] \cdot 1_{\{b_2 > b_1\}} \quad (12)$$

$$\Psi_2(b_1, b_2) = (b_2 - b_1) \cdot 1_{\{b_2 > b_1\}}$$

$$\Psi_3(b_1, b_2) = \frac{1}{2(\tau_3 - \tau_2)}[(b_1 - \tau_3)^2 - (b_2 - \tau_3)^2] \cdot 1_{\{b_2 > b_1\}},$$

$$\text{trap}(\gamma; \tau_0, \tau_1, \tau_2, \tau_3) = \begin{cases} \frac{(\gamma - \tau_0) D_{sd}}{(\tau_1 - \tau_0) D_{sd}} & \tau_0 < \gamma < \tau_1 \\ 1 & \tau_1 \leq \gamma \leq \tau_2 \\ \frac{(\tau_3 - \gamma) D_{sd}}{(\tau_3 - \tau_2) D_{sd}} & \tau_2 < \gamma < \tau_3 \\ 0 & \text{otherwise} \end{cases}, \quad (13)$$

and $$NF_1 = \begin{cases} \Delta_\gamma, & \text{for forward projection} \\ \frac{\tau_3 + \tau_2 - \tau_1 - \tau_0}{2}, & \text{for back projection} \end{cases}, \quad (14)$$

where $\tau_0 \sim \tau_3$ may denote the vertices of the trapezoid function that are the projected angles along the γ coordinates of four corner points located at $$\left(x \pm \frac{\Delta_x}{2}, y \pm \frac{\Delta_y}{2}\right)$$

and not related to z.

For a multi-slice CT detector, the cone angle may be small. The footprint shadow may be approximated by a rectangle defined as:

$$F_2(t_l, \beta, \vec{n}) = \quad (15)$$

$$\frac{1}{NF_2} \begin{cases} \max\left(0, \left(\min\left(t_l + \frac{\Delta_t}{2}, t_+\right) - \max\left(t_l - \frac{\Delta_t}{2}, t_-\right)\right)\right), \Delta_z' = \Delta_z \\ \frac{\left(\max\left(0, \left(\min\left(t_l + \frac{\Delta_t}{2}, t_+\right) - \max\left(t_l - \frac{\Delta_t}{2}, t_-\right)\right)\right) + NOLZ\right)}{2}, \\ \frac{\Delta_z}{2} \leq \Delta_z' < \Delta_z \end{cases}$$

in which, $$NOLZ = \max\left(0, \left(\min\left(t_l + \frac{\Delta_t}{2}, t_+, t_+'\right) - \max\left(t_l - \frac{\Delta_t}{2}, t_-, t_-'\right)\right)\right), \text{ and,} \quad (16)$$

$$NF_2 = \begin{cases} \Delta_t, & \text{for forward projection} \\ \begin{cases} t_+ - t_-, \Delta_z' = \Delta_z \\ \frac{t_+ + t_+' - t_- - t_-'}{2}, \frac{\Delta_z}{2} \leq \Delta_z' < \Delta_z \end{cases}, & \text{for back projection} \end{cases}, \quad (17)$$

where $t_+$ and $t_-$ may denote the boundaries of the rectangular whose endpoints are located at $$\left(x, y, z \pm \frac{\Delta_z}{2}\right),$$

and $t'_+$ and $t'_-$ may denote the boundaries of the rectangular whose endpoints are located at $$\left(x, y, z \pm \frac{2\Delta_z' - \Delta_z}{2}\right).$$

In some embodiments, the maximum image slice overlap ratio $$\frac{\Delta_z'}{\Delta_z}$$

may be defined as 50%.

Similarly, the footprint amplitude may be separated into two independent directions:

$$l(\gamma_k, t_l, \beta, \vec{n}) = l_{\varphi_0}(\beta, \vec{n}) \cdot l_\theta(t_l), \quad (18)$$

and $$l_{\varphi_0(\beta, \vec{n})} = \quad (19)$$

$$\begin{cases} \frac{\Delta_x}{\max\{|\cos(\varphi_0(\beta, \vec{n}))|, |\sin(\varphi_0(\beta, \vec{n}))|\}}, & \text{for forward projection} \\ \frac{1}{\max\{|\cos(\varphi_0(\beta, \vec{n}))|, |\sin(\varphi_0(\beta, \vec{n}))|\}}, & \text{for back projection} \end{cases},$$

in which $$l_\theta(t_l) = \frac{1}{|\cos(\theta(t_l))|} \quad (20)$$

$$\theta(t_l) = -\arctan\left(\frac{t_l}{D_{sd}}\right),$$

In equations (14)-(17), $l_{\varphi_0(\beta,\vec{n})}$ m may represent the casting ray length through the nth voxel in the detector channel direction, and $l_{\theta(t_l)}$ may represent a cone-direction scale that may transform $l_{\varphi_0(\beta,\vec{n})}$ to the length in a 3D space. For $l_{\varphi_0(\beta,\vec{n})}$, the azimuthal angle $\varphi_0(\beta,\vec{n})$ may denote the azimuthal angle of the ray connecting the source and the center of the nth voxel.

Therefore, the backward/forward model may be re-written as $$\text{Proj}(\gamma_k,t_l,\beta) = \Sigma_{(x,y,z)} l_{\varphi_0(\beta,\vec{n})} l_{\theta(t_l)} F_1(\gamma_k,\beta,\vec{n}) F_2 (t_l,\beta,\vec{n}) f(\vec{n}), \quad (21)$$

and $$f(\vec{n}) = \Sigma_{(\gamma_k,t_l)} l_{\varphi_0(\beta,\vec{n})} l_{\theta(t_l)} F_1(\gamma_k,\beta,\vec{n}) F_2 (t_l,\beta,\vec{n}) \text{Proj}(\gamma_k,t_l,\beta). \quad (22)$$

It shall be known that for some iterative reconstruction methods, each iteration may include one forward projection and one backward projection, where the forward projection may be either a discretized or continuous evaluation of the transform, and the backward may be the adjoint of the forward projector (e.g., the footprint).

Figure 10:
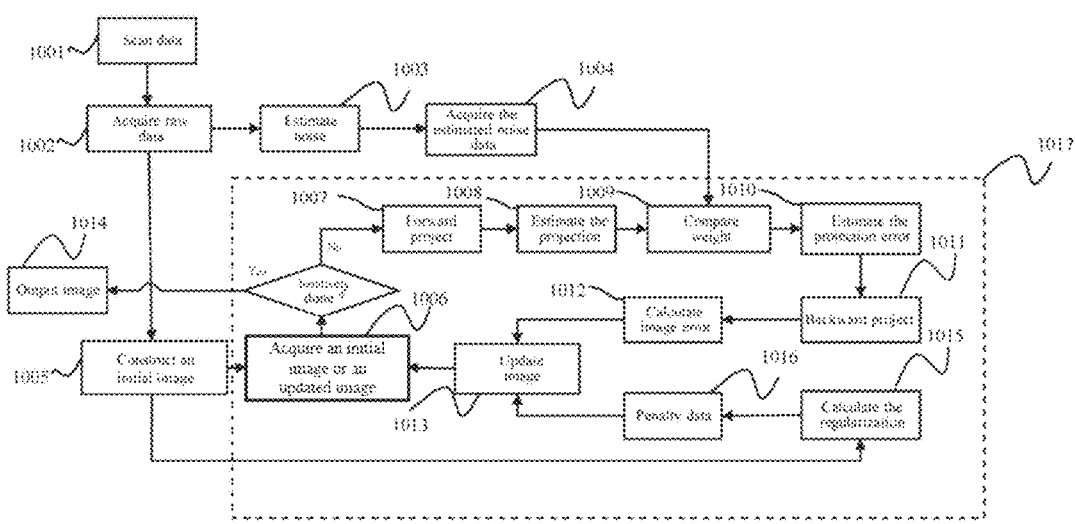
FIG. 10 is a flowchart illustrating a process of iterative reconstruction according to some embodiments of the present disclosure.
Figure 13A:
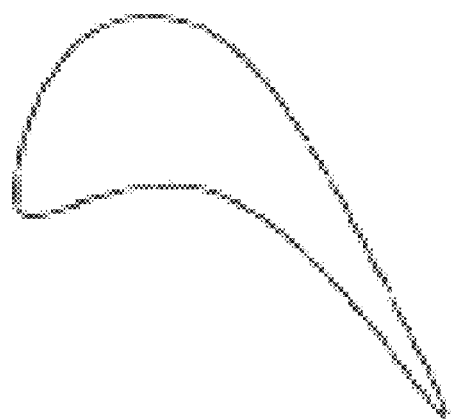
FIGS. 13A and 13B are two diagrams illustrating the actual image and initially estimated image of an exemplary object according to some embodiments of the present disclosure.
Figure 13B:
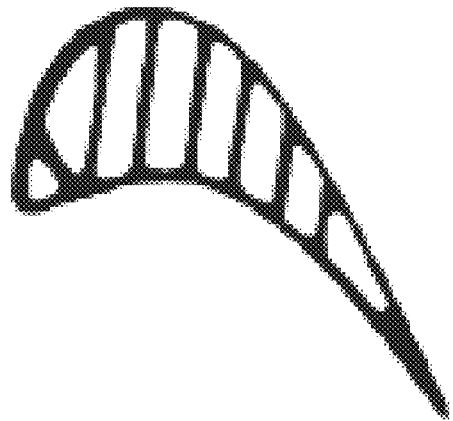

FIG. 10 illustrates an exemplary flowchart of a process of an image reconstruction according to some embodiments of the present disclosure. Raw data may be acquired in step 1002 through, for example, a scan process (for example, a scan process in which an object is scanned) in step 1001. At least two different processing ways may be conducted based on the raw data acquired in step 1002. The object may be a human body (for example, a patient), a part of the human body, an X-ray-safe item whose inner structure needed to be imaged non-invasively or non-destructively (e.g., an antique, an instrument, etc.), or the like. Merely by way of example, the raw data may be generated by a CT scan in step 1001, or it may be obtained from other resources (e.g., a computer-simulated scan). An initial reconstruction may be performed in step 1005 based on the raw data acquired in step 1002, where an initial image may be generated. In some embodiments, the initial reconstruction according to a reconstruction algorithm may generate an initial image relating to the object obtained from a transformation of the raw data acquired in step 1002. Examples of such reconstruction algorithms may include those based on Feldkamp-Davis-Kress (FDK) reconstruction, maximum a posteriori probability (MAP), maximum likelihood (ML), algebraic reconstruction technique (ART), entropy-based optimization, least squares (LS) or penalized weighted least squares (PWLS), or the like, or a combination thereof. The described algorithms may be executed once, or may be executed iteratively. In some embodiments, the initial image may also be appropriately set by default. For example, if an object image as shown in FIG. 13B is to be scanned and reconstructed, the image illustrated in FIG. 13A, which is just an edge shape of the object may be set as the initial reconstruction. Additionally, the raw data acquired in step 1002 may proceed to noise estimation in step 1003, and an estimated noise data may be generated in step 1004. A noise model may be acquired by noise estimation in step 1003, which may be conducted by the noise reduction unit 403. The noise estimation in step 1003 may include estimating the noise contained in the raw data acquired in step 1002 by fitting one or more noise models to the estimated noise. As used herein, the noise may include electronic noises that may be generated by an electronic device, e.g., a sensor, the circuitry of the scanner, or the like, or a combination thereof. The noise model(s) may indicate the noise distribution of an image, noise amplitude at respective point(s) of an image, or the like, or a combination thereof.

The reconstruction described may include an iterative reconstruction process that may include a computer based iterative processing. The iterative reconstruction process may include repeated projections and noise elimination processes, etc. The above mentioned examples of models are provided for illustration purposes and not intended to limit the scope of the present disclosure.

An iterative reconstruction of image(s) in the dash box 1017 may relate to the noise estimation obtained in step 1003 to step 1004, as described in step 703 and step 704 in FIGS. 7A, and 7B. During the first iteration, an initial image or updated image may be acquired in step 1006 by the direct input of the initially constructed image in step 1005; while in a subsequent iteration, the image in step 1006 may be updated by a reconstructed image generated from the previous iteration. A determination may be made regarding whether the iteration is completed after step 1006. If the iteration is completed, the process may proceed to output the image in step 1014. In some embodiments, the output image obtained in step 1014 may be further optimized in the following steps, e.g., enhancing contrast as described in FIGS. 7A, and 7B. If further iteration is needed, it may proceed to step 1007, in which a forward projection may be carried out. There may be different kinds of stopping conditions to determine whether the iteration is completed. In some embodiments, the stopping conditions may relate to one or more parameters set in the system. For example, the stopping condition may be that the difference between the reconstructed images from the current iteration and the previous iteration is below a certain threshold. In other embodiments, the stopping conditions may be determined by a user. For example, the clinical images relating to a certain tissue after several iterations may be accepted by a doctor.

The forward projection in step 1007 may be a computer-based projection that may transform either the initial image in the first iteration or the updated image in other iterations. Merely by way of example, a voxel (or pixel) in a 3D (or 2D) image (e.g., the initial image, or the updated image) may include information relating to the projection. The information may include, but not limit to, the geometry of the voxel (e.g., the shape, the position, the size, or the like, or a combination thereof) and the voxel (or pixel) value (e.g., the distribution of the gray scale, the distribution of the RGB level, the distribution of the brightness, or the like, or a combination thereof), or the like, or a combination thereof. An estimated projection may be performed in step 1008 based on the forward projection in step 1007.

In step 1009, a weighted comparison may be performed based on, for example, the estimated noise data obtained in step 1004 and the estimated projection obtained in step 1008. In some embodiments, the estimated noise data obtained in step 1004 may include at least one parameter relating to at least one noise model fit to the estimated noise generated in the noise estimation in step 1003.

In some embodiments, the weighted comparison in step 1009 may include identifying a correlation between the estimated projection obtained in step 1008 and the estimated noise data obtained in step 1004 and generating a weighted estimation based on the correlation. In step 1010, a projection error may be identified. The projection error may be generated based on the noise model obtained in step 1004 and the weighted estimation obtained in step 1009 based on the correlation between the estimated projection obtained in step 1008 and the estimated noise data obtained in step 1004. The projection error may be further transformed back, for example, by way of a backward projection, in step 1011 to the image domain to provide an image error in step 1012. In step 1013, the image error generated in step 1012 may be used to update the image in combination with penalty data generated in step 1016. The penalty data may be obtained from a regularization calculation performed in step 1015 based on either the initial image in the first iteration or the updated image in other iterations. As described herein, the regularization calculation may characterize an inherent property of the CT system and preserve some characteristics within the image. Exemplary characteristics may include the sharp edge between a high intensity region and a low intensity region. In some embodiments, the regularization calculation may help enhance the quality of the image by, for example, improving the smoothness within a high intensity region or a low intensity region. In some embodiments, the regularization calculation performed in step 1015 may distinguish regions with different intensity. For example, the regularization calculation performed in step 1015 may be helpful in understanding the position of a metal implant inside the body of a patient. The regulation calculation may increase the visibility of a sharp edge between the metal and a non-metal tissue.

Based on the penalty data obtained in step 1016 and/or the image error obtained in step 1012, an image may be updated in step 1013. For instance, the update may be based on the multiplication of the penalty data and the image error. The update may improve the quality of the image obtained in the previous iteration. The process may be repeated for a certain number of iterations or until a criterion is met.

In some embodiments, the forward projection in step 1007 may be determined by the geometry relationship between the radiation source, the object, and the detector. For example, the contribution factor $a(\gamma_k, t_j, \beta, \vec{n})$ may be determined by the relative locations of the radiation source, the object, and the detector. In some embodiments, the forward projection in step 1007 may be determined by the image voxel value $f(\vec{n})$. As used herein, the image voxel value $f(\vec{n})$ may include information relating to, e.g., the gray scale of a voxel, the RGB level of a voxel, the brightness of a voxel, or the like, or a combination thereof. Moreover, the distribution of the voxel values in the image may be configured in different manners. For example, the image voxel value $f(\vec{n})$ of two neighboring voxels may be either continuous or discretized. It shall also appreciated by persons having ordinary skills in the art that other physical effects may be further taken into account during the forward projection in step 1007. Examples of such physical effects may be a polychromatic X-ray spectrum, a finite detector point-spread function, a finite focal spot size, azimuthal blur, scattered radiation, measurement noise, or off-focal radiation, or the like, or a combination thereof.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, it shall be appreciated to those skilled in the art that the regularization calculation in step 1015 and the penalty data generated in step 1016 may be unnecessary. Thus, the image update in step 1013 may depend only on the image error in step 1012. Additionally, forward projection may be carried out in step 1007 or other appropriate parts of the process described in FIG. 10 in reality. In another example, the projection error generated in step 1010 may be used to update the estimated projection in step 1008, and the updated projection may be transformed back to the image domain by the backward projection in step 1011. As a result, the transformed image may be used in the following iterative steps as an updated image.

Figure 11:
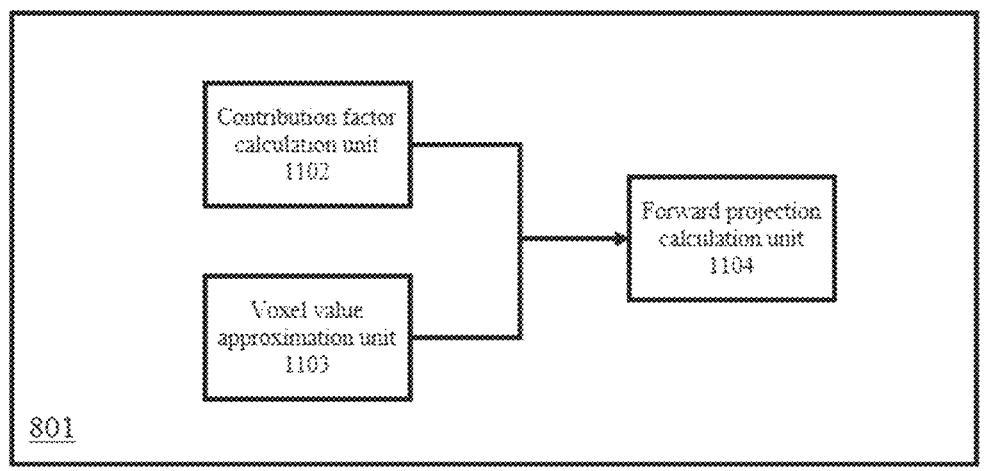
FIG. 11 is a block diagram of a forward projection block according to some embodiments of the present disclosure.

FIG. 11 depicts an exemplary block diagram of a forward projection block according to some embodiments of the disclosure. A forward projection block 1101 may include a contribution factor calculation unit 1102 configured to generate a contribution factor, a voxel value approximation unit 1103 configured to generate a voxel value, and a forward projection calculation unit 1104. The forward projection calculation unit 1104 may be configured to receive the contribution factor and the voxel value to conduct the projection based on an algorithm (e.g., as described in equation (5)).

In some embodiments, the contribution factor may be determined by the geometry relationship between the radiation source (e.g., an X-ray source), the object, and the detector. In one example, the contribution factor may be determined by the relative locations of the radiation source, the object, and the detector. In another example, the configuration of a voxel may have an influence on the contribution factor. As used herein, the configuration of a voxel may include, but not limit to, the geometric model of a voxel (e.g., rectangular cuboid model, polar grids model, wavelet model, overlapping circles or spheres model, disk model, polygon model, and etc.), the size of a voxel (e.g., the dimensions along x, y axis, the thickness along z direction).

In some embodiments, the voxel value may include information relating to, e.g., the gray scale of a voxel, the RGB level of a voxel, the brightness of a voxel and etc. Moreover, the distribution of the voxel values in the image may be configured in different manners. For example, the distribution of the voxel values may be configured as discretized, meaning that the voxel values of two neighboring voxels are not continuous. In another example, the distribution of the voxel value may be configured as continuous, meaning that the voxel values of neighboring voxels are continuous. In another example, the distribution of the voxel values may be configured as partially discretized and partially continuous, meaning that the voxel values of at least some voxels in one condition are continuous and the voxel values of at least some voxels in another condition are discretized. Merely by way of example, the voxel values of two neighboring voxels in the x-y plane may be discretized, and the voxel values of two neighboring voxels along the z direction may be continuous. In another example, the voxel values of two neighboring voxels in the x-y plane may be continuous, and the voxel values of two neighboring voxels along the z direction may be discretized. In still another example, the voxel values of two neighboring voxels along the z direction within one range of the z coordinate may be discretized, and the voxel values of two neighboring voxels along the z direction within another range of the z coordinate may be continuous.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, the forward projection block 1101 may include at least one unit that may generate information relating to some physical effects. Examples of such physical effects may be a polychromatic x-ray spectrum, a finite detector point-spread function, a finite focal spot size, azimuthal blur, scattered radiation, measurement noise, or off-focal radiation, or the like, or a combination thereof.

Figure 12:
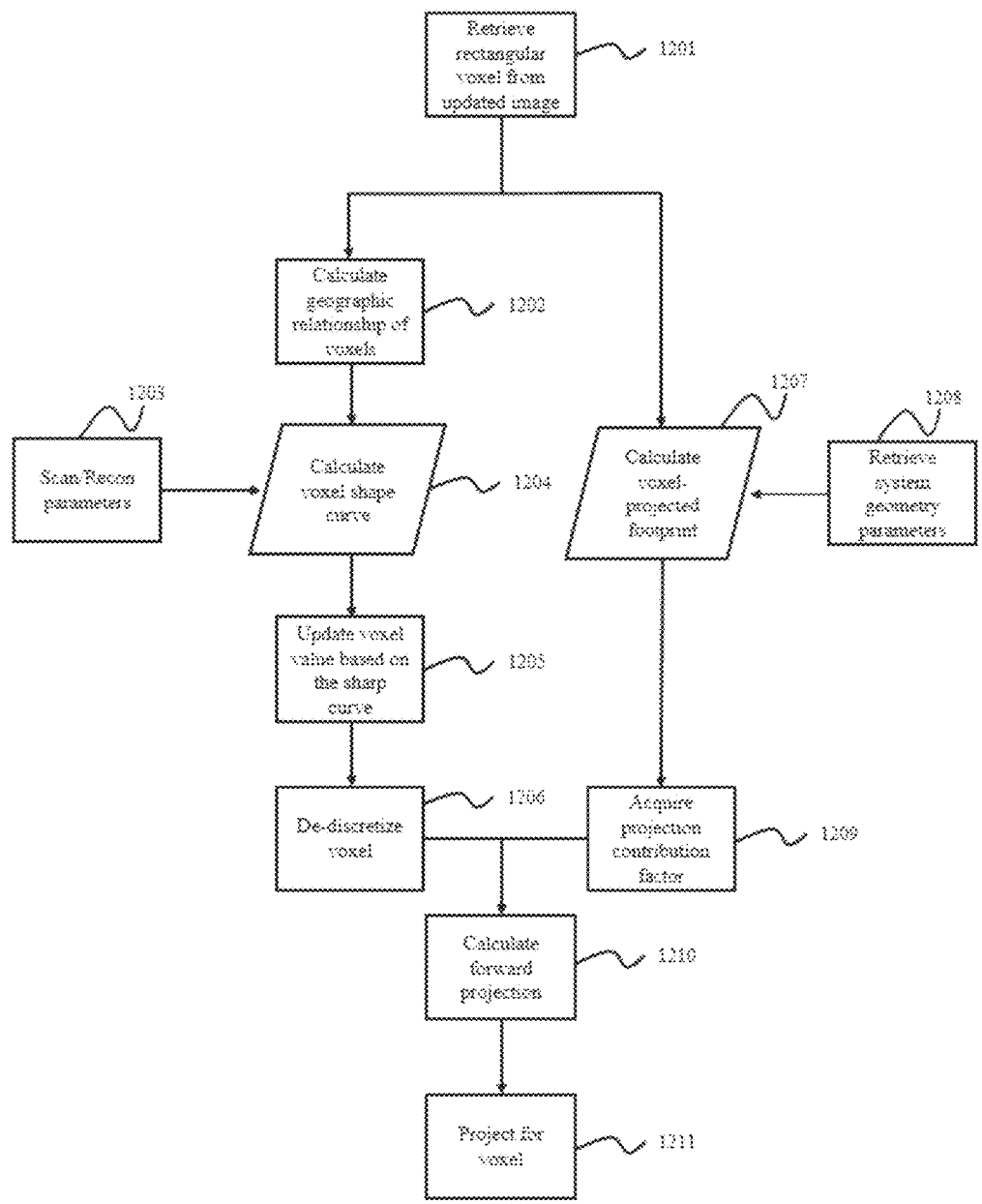
FIG. 12 is a flowchart illustrating a process of forward projection according to some embodiments of the present disclosure.

FIG. 12 illustrates an exemplary forward projection schematics according to some embodiments of the disclosure. In step 1201, voxels may be generated from an image (e.g., the initially constructed image, or an updated image obtained in a previous iteration). Merely by way of example, a voxel may have the shape of a rectangular cuboid. Then, the calculation of the contribution factor may be calculated in step 1207 to step 1209 (the right branch of flowchart illustrated in FIG. 12), and the voxel value may be calculated in step 1202 to step 1206 (the left branch of the flowchart illustrated in FIG. 12). In step 1204, the forward projection may be calculated by the forward projection calculation unit 1104. In some embodiments, the contribution factor may be calculated by the contribution factor calculation unit 1102, and the voxel value may be approximated by the voxel value approximation unit 1103. In some embodiments, the voxel value approximation unit 1103 may be configured to de-discretize or update the voxel value of a voxel of interest according to the values of the voxels that may have a certain geographic relation with the voxel of interest. For example, the geographic relation may be that a voxel is next to the voxel of interest, or a voxel is a plurality of voxels distance apart from the voxel of interest. As another example, the relation may be that a voxel is within a limited range (or distance) or along a selected direction from the voxel of interest.

In the voxel value approximation process, the geographic relationship between a voxel of interest and another voxel may be assessed in step 1202. The assessment of the geographic relationship may be based on a rectangular voxel model, in which a shape curve may be constructed. For instance, it may include calculating the values of neighboring voxels. By taking into account the influence of other voxels in addition to the voxel of interest, it may also include calculating the gradient of the change among neighboring voxels. In some embodiments, the "neighboring voxels" may be the adjoining voxels, e.g., voxels that share at least one rectangular face (if a rectangular voxel model is used). In some embodiments, "neighboring voxels" may also be the voxels that are located within a distance from the voxel of interest, e.g., within a number of voxels in a direction from the voxel of interest. In some embodiments, "neighboring voxels" may be different in different manners. For example, a neighboring voxel of a voxel of interest may be any voxel that is located within a first number of voxels from the voxel of interest in the x-y plane, within a second number of voxels from the voxel of interest along the z direction, or within a third number of voxels from the voxel of interest along any diagonal direction. Either two of the first number, the second number, and the third number may be equal, or different. In addition, a mathematical model may also be used in defining the geographic relationship between neighboring voxels. For example, an effect factor may be introduced. The effect factor may indicate the effect of a particular neighboring voxel to the voxel of interest. The effect factor may be designed to be dependent on the distance between the neighboring voxel and the voxel of interest, or may also be dependent on the value or position of the voxel of interest.

A shape curve may be generated in step 1204 based on, for example, the geographic relationship between a voxel of interest and one or more other neighboring voxels, the voxel values of these voxels, and the scan/reconstruction parameters acquired in step 1203, or the like, or a combination thereof. Exemplary scan/reconstruction parameters may be the slice thickness, parameters relating to the voxel model (for example, a rectangular voxel model, a cubic voxel model, a spherical voxel model, etc.), or the like, or a combination thereof. As used herein, scan/reconstruction parameters may be set by the users based on different conditions. In step 1205, the voxel value may be updated based on the shape curve. As a result, it may generate a de-discretized voxel in step 1206.

Figure 14:
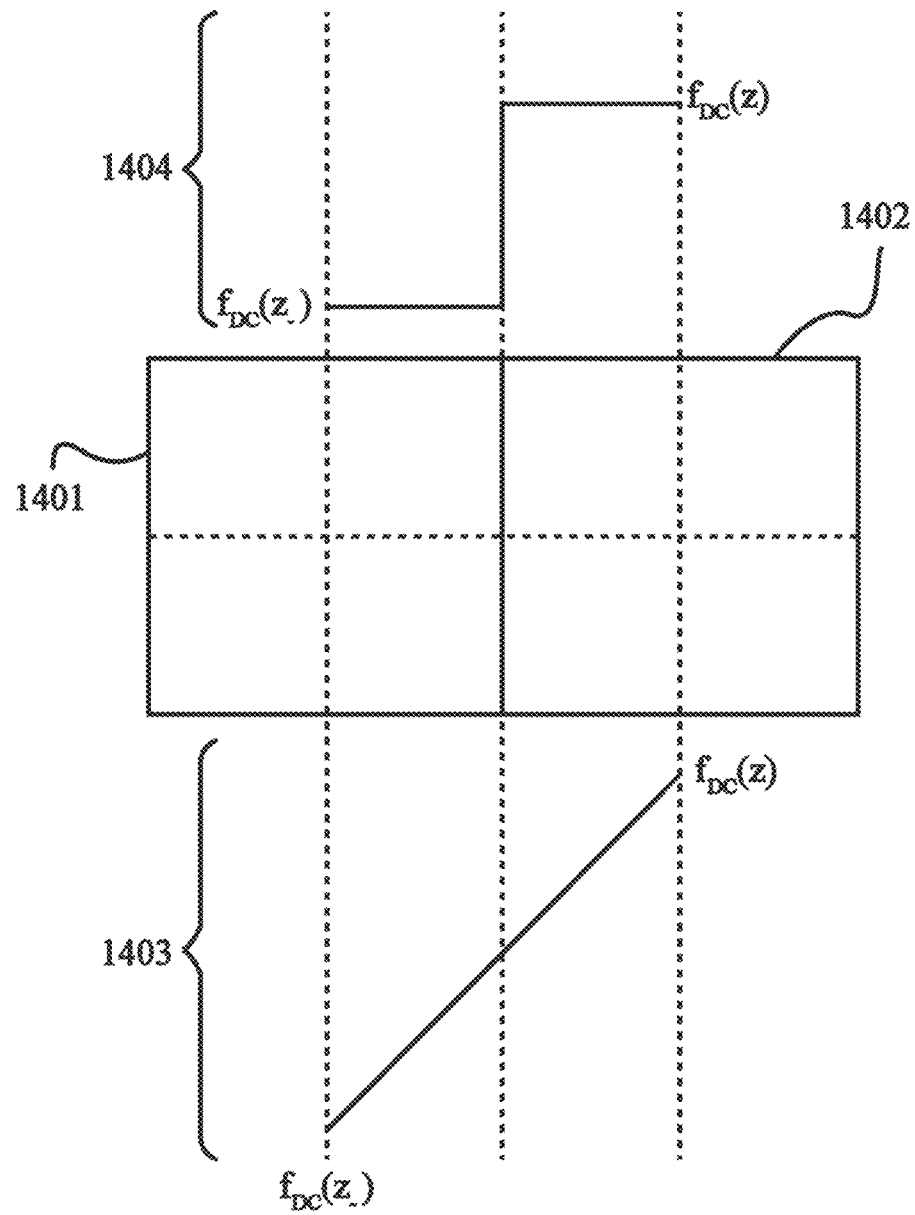
FIG. 14 is a set of graphs illustrating a z-direction linear curve constructed by considering the relationship between two adjoined voxels according to some embodiments of the present disclosure.
Figure 15:
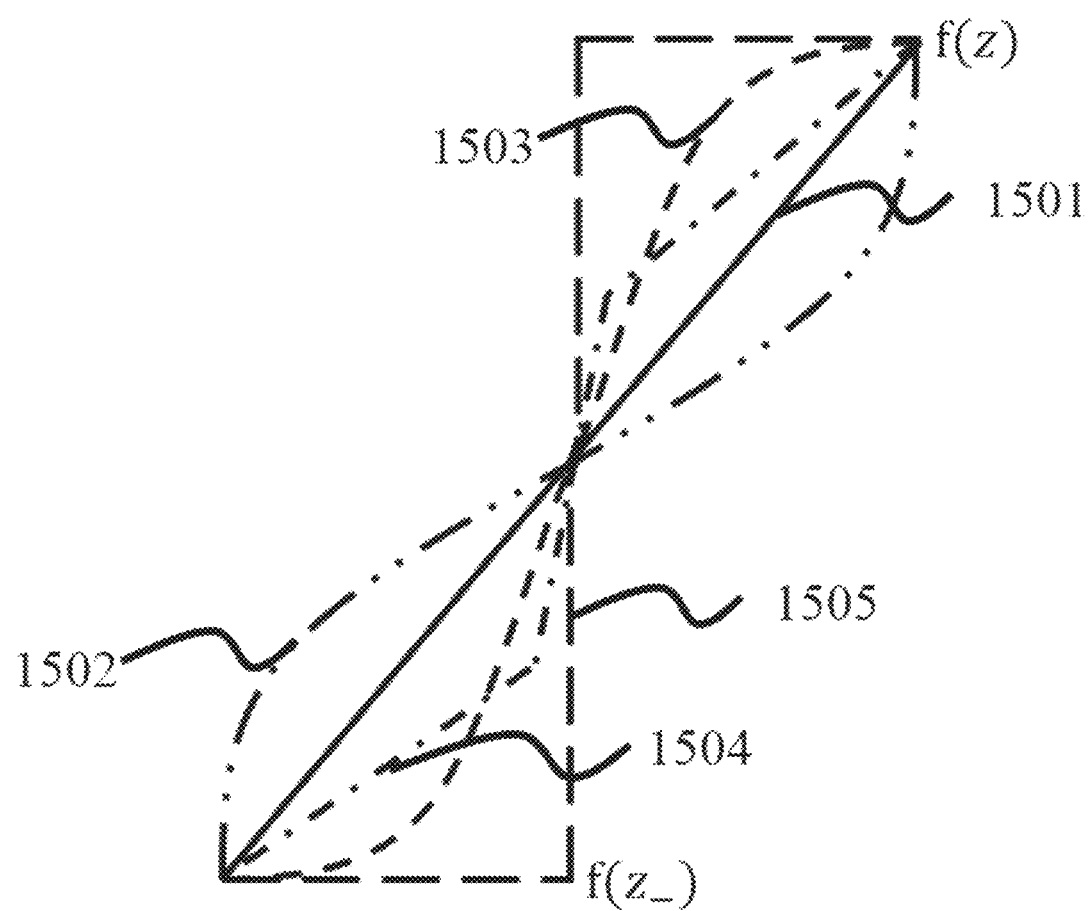
FIG. 15 is a set of graphs illustrating some exemplary non-linear curve constructed between two adjoined according to some embodiments of the present disclosure.

It shall be noticed that the shape curve may be constructed along a direction to approximate de-discretized voxel values. In some embodiments, the voxel values may change linearly from the voxel of interest to the neighboring voxels. FIG. 14 illustrates a linear curve constructed by considering the geographic relationship between two adjoining voxels 1401 and 1402 along the z-direction. If the voxel 1401 or the voxel 1402 is forward projected to the detector, the effect of the whole voxel of interest to the detector may be determined by its left part and its right part. A linear curve 1403 may represent a linear change of voxel value from the right part of the voxel 1401 to the left part of the voxel 1402, and the slope of the linear curve may be determined by the gradient of the change in the voxel values of the voxel 1401 and the voxel 1402. Besides the linear change, other types of shape curves may also be used. Exemplary shape curves are shown in FIG. 15. For instance, curves 1501, 1502, 1503 and 1504 may be a fit function determined by the voxel values of both the voxel of interest and a neighboring voxel. Merely by way of example, the points used to determine the fit function may include a point with a voxel value in the voxel of interest and a point with a voxel value in the neighboring voxel. Examples of the fit functions may include a polynomial function, an exponential function, a logarithmic function, a multi-dimensional function, or the like, or a combination thereof. Moreover, the fit function may be a weighted combination of different types of functions exemplified above. For instance, the fit function may be a weighted combination of the solid line 1501 and the dash dot curve 1505; the fit function may be a weighted combination of the dash dot curve 1505 and curves 1501-1504, or the like, or a combination thereof.

Referring back to FIG. 12, after the generation of a rectangular voxel from an updated image in step 1201, the projected footprint of the voxel may be calculated in step 1207. System geometry parameters may also be retrieved and forwarded in step 1208 to generate the footprint. As described elsewhere in the disclosure, the system geometry parameters may include, but not limit to, the relative locations of the source, the object and the detector, the shape and size of the voxel, the shape and size of a detector cell, or the like, or a combination thereof. Based on a contribution factor (e.g., the footprint) that may be generated in step 1209 and/or the de-discretized voxel value generated in step 1206, the parameters for forward projection may be calculated in step 1210.

In some embodiments, convolution in the discrete domain may be used to produce the parameters for forward projection. In some embodiments, a matrix operation and/or a linear algebra calculation may be utilized. After obtaining the projection parameters from the contribution factor and/or the de-discretized voxel value, forward projection may be performed in step 1211, in which the voxels in an image (in the image domain) may be transformed to projected data. The forward projection may be performed by a computer or otherwise automatically without a user intervention.

It should be noticed that many alternatives, modifications, and variations will be apparent to those skilled in the art. For example, It should be appreciated for those skilled in the art that voxel projected footprint 1207 may be calculated based on some other factors in addition to the system geometry parameters. Examples of such factors may include a polychromatic X-ray spectrum, a finite detector point-spread function, a finite focal spot size, azimuthal blur, scattered radiation, measurement noise, or off-focal radiation, or the like, or a combination thereof. It should also be appreciated for those skilled in the art that the sequence of the calculation of the contribution factor and the approximation of the voxel value may be varied. For example, the calculation of the contribution factor may be performed prior to the approximation of the voxel value, the approximation of the voxel value may be performed prior to the calculation of the contribution factor, or the calculation of the contribution factor and the approximation of the voxel value may be perform simultaneously. Moreover, some of the steps described in FIG. 12 may be omitted. For example, the geographic relationship in step 1202 may be omitted in at least some of the iteration steps, and the geographic relationship determined in a previous iteration may be used in a subsequent iteration.

The method of approximating voxel values, e.g., updating the value of voxels $f(\vec{n})$ based on the neighboring voxels, may be discussed hereinafter. It should be noticed that voxel shape curve may include, but not limit to a straight line, a curve, or the like, or a combination thereof. The neighboring voxels may be defined but not limited to adjoining voxels or voxels within some distance or the like.

For simplicity, an exemplary straight shape curve is used and the neighboring voxels are defined as the adjoining voxels in the z direction in the following illustrative description. Referring back to FIG. 14, 1401, 1402 may be two adjoining voxels to be forward projected. Each voxel may be divided into the left and right parts where "−" denotes the left and "+" denotes the right (the z direction is defined along the line connecting the center of the voxel 1401 and the center of the voxel 1402 herein). Thus, if a voxel is forward projected to the detector, the contribution of the whole voxel to the detector may be determined by the left part value $f_-(z)$ and the right part value $f_+(z)$ of the voxel, and the total contribution may be calculated as a weighted sum of the two parts. In some embodiments, the voxel value of various parts of a voxel may be constant. For instance, for each voxel the voxel value of the left part $f_-(z)$ may be equal to the voxel value of the right part $f_+(z)$. The voxel value of the voxel 1401 may be $f_{DC}(z_-)$ and the voxel value of the voxel 1402 may be $f_{DC}(z)$, respectively, as shown in 1404. In some embodiments, $f_-(z)$ and $f_+(z)$ of a voxel may be different. Moreover, $f_-(z)$ and $f_+(z)$ of a voxel may be influenced by one or more neighboring voxels. Assuming the linear change of voxel values from the right part of the voxel 1401 to the left part of the voxel 1402, the values of each part voxel may be defined as:

$$f_-(x) = \begin{cases} \dfrac{f_-(z_{t_-}) + f_-(z_{t_+})}{2}, & t_z \geq B_+ \\ \dfrac{f_-(z_{t_-}) + f_{DC}(z)}{2}, & t_z \geq B_+ \end{cases} \quad (23)$$

and $$f_+(z) = \begin{cases} \dfrac{f_+(z_{t_+}) + f_+(z_{t_-})}{2}, & t_z \geq B_- \\ \dfrac{f_{DC}(z) + f_+(z_{t_+})}{2}, & t_z \geq B_- \end{cases},$$

where $t_z$ may denote the voxel center footprint on the detector whose image coordinate is located at (x, y, z), and $B_-$ and $B_+$ may denote the left boundary and the right boundary of the respective voxel footprint on the detector. In the example of a linear change in voxel values, $f(z_{t_-})$ may denote the voxel value casting on $B_-$, and $f(z_{t_+})$ may denote the voxel value casting on $B_+$. For one of the two different voxel parts, its voxel value of the entire voxel may be considered the average of $f(z_{t_-})$ and $f(z_{t_+})$. In some embodiments, a voxel may be divided into three or more parts.

In a linear change of the voxel values between two neighboring voxels, as shown in equation (23), the voxel value of 1402 may be determined based on the voxel value of voxel 1401. Moreover, the linear relationship between the voxel values of the two voxels may vary based on different conditions. In some embodiments, the relationship between the voxel values of the two voxels may relate to the contribution of casting from each voxel to a detector cell. Merely by way of example, if the casting of the voxel 1402 is directly facing the detector cell, the influence from the neighboring voxel may be limited, e.g., as described by $t_z<B_+$ or $t_z>B_-$. If the casting of the voxel 1401 and the voxel 1402 contribute equally on the detector cell, or the detector cell is directly facing the casting of the contacting plane of the voxel 1401 and the voxel 1402, the influence from the neighboring voxel may be greater, e.g., as described by $t_z \geq B_+$ or $t_z \leq B_-$. It shall be appreciated to those skilled in the art that the contribution of the casting of the voxels on a detector cell may be determined by a plurality of factors. Examples of such factors may include, the geometric shape of the voxels, the size of the voxels, the slice thickness of the x-ray, the geometry relationship between the radiation source, the object and the detector, or the like, or a combination thereof.

Referring back to the embodiments of a linear change of voxel values, $f_-(z_{t_-})$ and $f_+(z_{t_+})$ may satisfy the following equation:

$$f_-(z_{t_-}) = \dfrac{f_{DC}(z) + f_{DC}(z_-)}{2} + Dz_- \left( \dfrac{f-(z_{t_-}) - f_{DC}(z_-)}{f_{DC}(z) - f_{DC}(z_-)} - \dfrac{1}{2} \right) \quad (24)$$

$$f_+(z_{t_+}) = \dfrac{f_{DC}(z) + f_{DC}(z_+)}{2} + Dz_+ \left( \dfrac{f+(z_{t_+}) - f_{DC}(z)}{f_{DC}(z_+) - f(z)} - \dfrac{1}{2} \right),$$

where $$Dz_- = f_{DC}(z) - f_{DC}(z_-) \quad (25)$$

$$Dz_+ = f_{DC}(z_+) - f_{DC}(z).$$

If the t-axis is parallel to the z-axis and the voxel values along the z-direction change linearly, the distance ratio between two footprint coordinates may be used. Thus, equation (23) may be re-written as:

$$f_-(z) = \frac{f_{DC}(z) + f_{DC}(z_-)}{2} + Dz_- l_- \quad (26)$$

$$f_+(z) = \frac{f_{DC}(z) + f_{DC}(z_+)}{2} + Dz_+ l_+,$$

where $$l_-(z) = \frac{B_- - (t_z - C) - \max(t_z - B_+, 0)}{2(t_z - t_{z-})} \quad (27)$$

$$l_+(z) = \frac{B_+ - (t_z + C) + \max(B_- - t_z, 0)}{2(t_{z+} - t_z)}.$$

where $t_{z-}$ may denote the left neighboring voxel center footprint whose image coordinate is located at $(x, y, z-\Delta'_z)$, and $t_{z+}$ may denote the right neighboring voxel center footprint whose image coordinate is located at $(x, y, z+\Delta'_z)$.

After the voxel values of the two parts of a voxel are acquired, the voxel value of the entire voxel $f_{Lin}(z)$ may be determined based on $f_-(z)$ and $f_+(z)$. For instance, $f_{Lin}(z)$ may be determined based on a weighted sum of $f_-(z)$ and $f_+(z)$ as shown in equation (28):

$$f_{Lin}(z) = \quad (28)$$
$$\frac{f_-(z) \cdot w_+ + f_+(z) \cdot w_-}{w_- + w_+} \approx f_{DC}(z) + Dz_- \cdot L_- \cdot Efft_+ + Dz_- \cdot L_- \cdot Efft_-,$$

where $$w_- = \begin{cases} Err, t_z \geq B_+ \\ t_z - B_-, t_z < B_+ \end{cases} = \max(Removeif(t_z, B_+) \cdot (t_z - B_-), Err) \quad (29)$$

$$w_+ = \begin{cases} Err, t_z \geq B_- \\ B_+ - t_z, t_z > B_- \end{cases} = \max(Removeif(B_-, t_z) \cdot (B_+ - t_z), Err),$$

and $$Efft_- = \frac{w_-}{w_+ + w_-} \quad (30)$$

$$Efft_+ = \frac{w_+}{w_+ + w_-}.$$

In equation (29) Removeif(a, b) may be defined as $$\frac{b - a + |b - a|}{2(b - a)},$$

and Err instead of zero is smaller than $e^{-N}$ (N may be determined by the parameters (e.g., precision) of the image processing module 120). The weight $w_\pm$ may denote the distance from $f_\pm(z)$ to $f_{DC}(z)$. In the t-axis, the distance may be expressed as the distance from $B_-$ and $B_+$ to $t_z$. The effect factor $Efft_-$ or $Efft_+$ may denote the proportion of the distance from the center of a particular part of a voxel to the voxel center.

Contribution of the left part and the right part of the voxel of interest may be same (e.g., the effect factor of each part may be 0.5). Thus, a linearized value of the voxel in this case may be defined as:

$$f_{Lin}(z) == \frac{f_-(z) + f_+(z)}{2} = f_{DC}(z) + \frac{Dz_- \cdot L_- + Dz_+ \cdot l_+}{2}. \quad (31)$$

In some further embodiments with various image slice thickness, the change of voxel values of voxels between adjoining voxels may be different. For example, a piece-wise linear change model may be used. Therefore, the updated value of the voxels (referred to in step 1205) may be defined as:

$$f(z) = f_{DC}(z) \cdot fPVEWeight + f_{Lin}(z) \cdot (1 - fPVEWeight), \quad (32)$$

where fPVEWeight may denote a weighting factor of the slice thickness.

As described elsewhere in the disclosure, besides the slice direction (the z direction), the forward projection may also be implemented along the x direction, and y direction, or any direction in the x-y plane. The voxel value of a voxel may relate to the neighboring voxels along any direction in the x-y plane.

It should be noticed that many alternatives, modifications, and variations will be apparent to those skilled in the art. For example, the change between neighboring voxels may be fit by different types of functions. Functions may include, for example, a quadratic function, a cubic function, a 4th degree polynomial, an nth degree polynomial, an exponential function, a logarithmic function, a trigonometric function, an anti-trigonometric function, a hyperbolic function, or the like, or a combination thereof. The above mentioned examples of functions are provided for illustration purposes and not intended to limit the scope of the present disclosure. The function type may be set based on the system or/and reconstruction parameters, e.g., the slice thickness. For example, with a slice thickness of less than 1 mm, e.g., 0.5 mm, a linear function may be used, with a slice thickness of more than 1 mm, e.g., 5 mm, a polynomial function or an exponential function may be used.

EXAMPLES

The following examples are provided for illustration purposes, and not intended to limit the scope of the present disclosure.

Figure 16A:
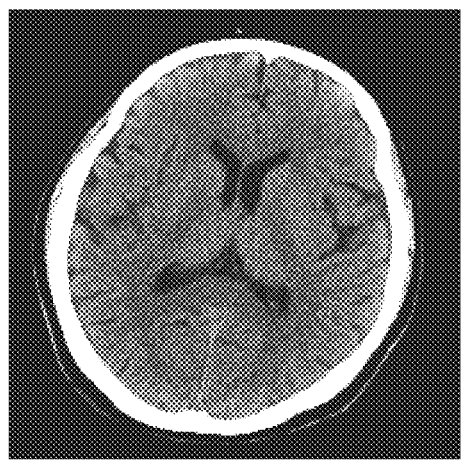
FIGS. 16A and 16B are two X-ray images that were generated based on noise reduction and contrast enhancement according to some embodiments of the present disclosure.
Figure 16B:
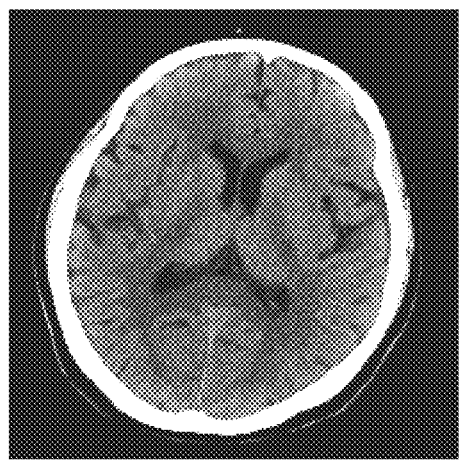

FIG. 16A and FIG. 16B are two X-ray images that were generated based on noise reduction and contrast enhancement according to some embodiments of the present disclosure.

Figures 17A, 17B:
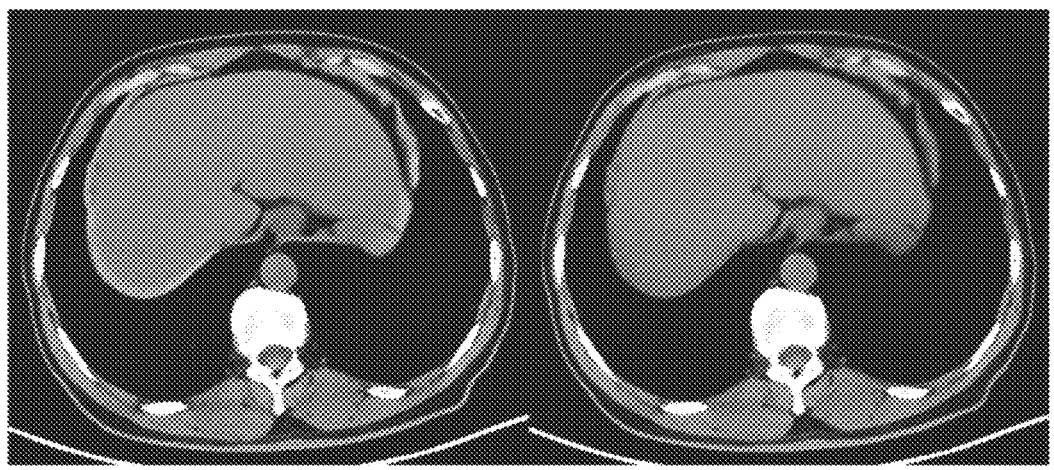
FIGS. 17A-17F are six X-ray images that were generated based on iterative reconstruction according to some embodiments of the present disclosure.
Figures 17C, 17D:
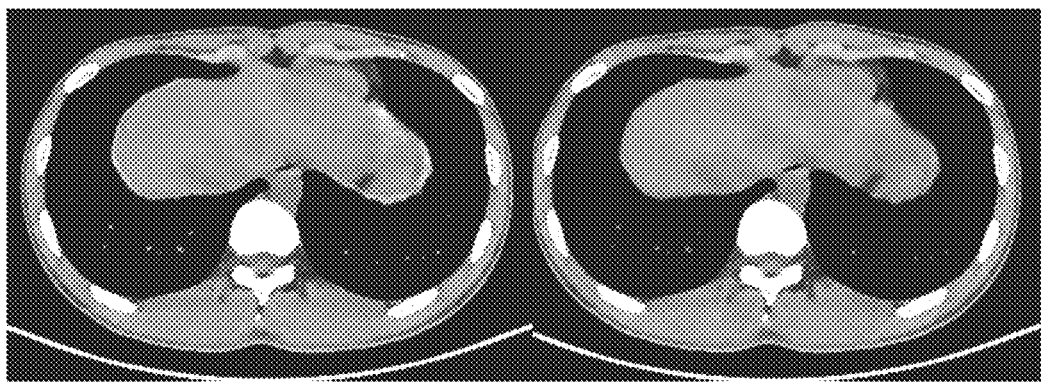
Figures 17E, 17F:

FIGS. 17A-17F illustrate six X-ray images that were generated based on iterative reconstruction according to some embodiments of the present disclosure. FIG. 17A, FIG. 17C and FIG. 17E are X-ray images generated based on rectangular voxel-based iterative reconstruction, while FIG. 17B, FIG. 17D and FIG. 17F are X-ray images generated based on de-discretization object parametrization. During the iterative reconstruction, the voxel value only changes along the z-direction.

Figures 18A, 18B:
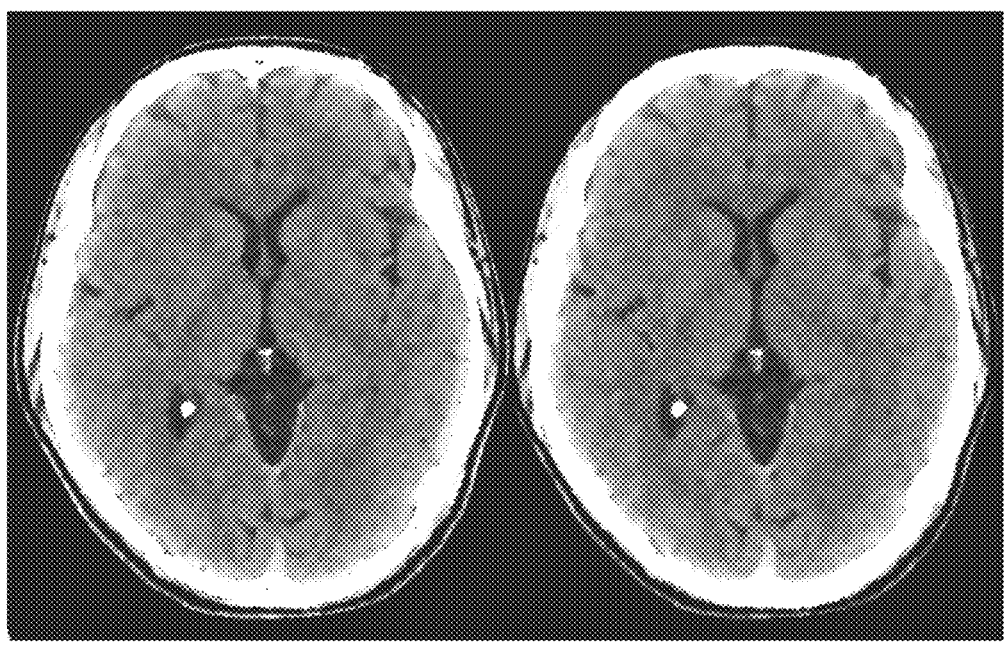
FIGS. 18A and 18B are two X-ray images that were generated based on iterative reconstruction according to some embodiments of the present disclosure.

FIG. 18A and FIG. 18B are two X-ray images that were generated based on iterative reconstruction according to some embodiments of the present disclosure. During the iterative reconstruction, the voxel value changes along the x, y and z direction.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method implemented on a computing device having at least one processor and a non-transitory storage medium for image reconstruction, the method comprising:
   receiving raw data relating to a subject;
   generating a first image based on the raw data;
   constructing a noise model that indicates a noise distribution of the first image;
   generating a second image by reducing noise from the first image based on the noise model;
   generating a third image by subtracting the second image from the first image, wherein the third image indicates the noise in the first image;
   generating a fourth image by improving a luminance or color of at least a portion of the second image; and
   generating a fifth image by combining the fourth image and the third image to add an amount of noise to the fourth image.

2. The method of claim 1, wherein the generating the first image comprises:
   performing a plurality of iterations.

3. The method of claim 2, further comprising generating an updated image during each of the plurality of iterations.

4. The method of claim 3, further comprising transforming the updated image to a projection domain to generate an estimated projection during each of the plurality of iterations.

5. The method of claim 1, wherein the third image is generated based on the noise model.

* * * * *